United States Patent [19]
Nakanishi

[11] Patent Number: 5,805,852
[45] Date of Patent: Sep. 8, 1998

[54] PARALLEL PROCESSOR PERFORMING BYPASS CONTROL BY GRASPING PORTIONS IN WHICH INSTRUCTIONS EXIST

[75] Inventor: Chikako Nakanishi, Hyogo, Japan

[73] Assignee: Mitsubishi Denki Kabushiki Kaisha, Tokyo, Japan

[21] Appl. No.: 745,134

[22] Filed: Nov. 7, 1996

[30] Foreign Application Priority Data

May 13, 1996 [JP] Japan .................................... 8-117962

[51] Int. Cl.⁶ ...................................................... G06F 15/16
[52] U.S. Cl. ................ 395/394; 395/800.23; 395/800.24
[58] Field of Search ..................................... 395/393, 394, 395/395, 800.23, 800.24, 377, 391, 388

[56] References Cited

U.S. PATENT DOCUMENTS

| | | | |
|---|---|---|---|
| 5,313,551 | 5/1994 | Labrousee et al. ..................... | 711/149 |
| 5,511,172 | 4/1996 | Kimura et al. ......................... | 395/582 |
| 5,574,939 | 11/1996 | Keckler et al. ...................... | 395/800.24 |
| 5,636,353 | 6/1997 | Ikenaga et al. ........................ | 395/394 |

*Primary Examiner*—Larry D. Donaghue
*Attorney, Agent, or Firm*—McDermott, Will & Emery

[57] ABSTRACT

A bypass control circuit uses a plurality of entries corresponding to a plurality of addresses of a register file to grasp in which one of eight result buffers a processing result of an instruction having a destination address corresponding to any of the plurality of entries exists. When a source address of data to be required by a latch circuit matches with a destination address of a processing result of an instruction held in any of the eight result buffers, the processing result of the instruction having the matching destination address is transferred from a result buffer holding the processing result of the instruction to the latch circuit. Thus, fast bypass control can be achieved.

17 Claims, 22 Drawing Sheets

FIG.4

| TSB CONTROL SIGNAL | T1 e1-1-1 | T2 e1-1-2 | T3 e1-2-1 | T4 e1-2-2 | T5 e1-3-1 | T6 e1-3-2 | T7 e1-4-1 | T8 e1-4-2 |
|---|---|---|---|---|---|---|---|---|
| TSB CONTROL SIGNAL | T9 m1-1-1 | T10 m1-1-2 | T11 m1-2-1 | T12 m1-2-2 | T13 m1-3-1 | T14 m1-3-2 | T15 m1-4-1 | T16 m1-4-2 |
| TSB CONTROL SIGNAL | T17 e2-1-1 | T18 e2-1-2 | T19 e2-2-1 | T20 e2-2-2 | T21 e2-3-1 | T22 e2-3-2 | T23 e2-4-1 | T24 e2-4-2 |
| TSB CONTROL SIGNAL | T25 m2-1-1 | T26 m2-1-2 | T27 m2-2-1 | T28 m2-2-2 | T29 m2-3-1 | T30 m2-3-2 | T31 m2-4-1 | T32 m2-4-2 |
| TSB CONTROL SIGNAL | T33 e3-1-1 | T34 e3-1-2 | T35 e3-2-1 | T36 e3-2-2 | T37 e3-3-1 | T38 e3-3-2 | T39 e3-4-1 | T40 e3-4-2 |
| TSB CONTROL SIGNAL | T41 m3-1-1 | T42 m3-1-2 | T43 m3-2-1 | T44 m3-2-2 | T45 m3-3-1 | T46 m3-3-2 | T47 m3-4-1 | T48 m3-4-2 |
| TSB CONTROL SIGNAL | T49 e4-1-1 | T50 e4-1-2 | T51 e4-2-1 | T52 e4-2-2 | T53 e4-3-1 | T54 e4-3-2 | T55 e4-4-1 | T56 e4-4-2 |
| TSB CONTROL SIGNAL | T57 m4-1-1 | T58 m4-1-2 | T59 m4-2-1 | T60 m4-2-2 | T61 m4-3-1 | T62 m4-3-2 | T63 m4-4-1 | T64 m4-4-2 |
| TSB CONTROL SIGNAL | T65 r-1-1 | T66 r-1-2 | T67 r-2-1 | T68 r-2-2 | T69 r-3-1 | T70 r-3-2 | T71 r-4-1 | T72 r-4-2 |

FIG.26 PRIOR ART

|  | CLOCK | | | | | |
|---|---|---|---|---|---|---|
|  | 1 | 2 | 3 | 4 | 5 | 6 |
| ADD | IF | ID | EX | MEM | WB ← A |  |
| SUB |  | IF | ID ↑ B | EX | MEM | WB |

FIG.27 PRIOR ART

ADD a1,a2,a3 — | IF | ID | EX | MEM | WB |
              |    | R  |    |     | W  |

SUB a4,a1,a5 — | IF | ID | EX | MEM | WB |
              |    | R  |    |     | W  |

ADD a6,a1,a7 — | IF | ID | EX | MEM | WB |
              |    | R  |    |     | W  |

PARALLEL PROCESSOR PERFORMING BYPASS CONTROL BY GRASPING PORTIONS IN WHICH INSTRUCTIONS EXIST

BACKGROUND OF THE INVENTION

1. Field of the Invention

The present invention relates to a parallel processor. It particularly relates to a parallel processor capable of fast bypass control.

2. Description of the Background Art

A parallel processor provided with a plurality of pipelines is provided to improve processor performance. Pipeline processing and hazard will now be described with respect to a conventional scalar processor provided with one pipeline.

Pipeline processing will be described first. Pipeline processing is a technique in which a plurality of instructions overlap for simultaneous execution. Currently, pipeline processing is a basic technique for obtaining fast CPUs (Central Processing Unit). In pipeline processing, one step of the pipeline is responsible for a portion of an instruction and executes it. The processing process for one instruction is divided into a plurality of smaller processing units. The smaller processing unit is referred to as a pipeline stage (referred to as "a stage" hereinafter). The stages are connected in order, to form one pipe.

Throughput of pipeline processing depends on the speed at which an instruction exits the pipeline. Since the stages are joined, all of the stages must complete their processings simultaneously. The time required for processing in one stage is referred to as "a machine cycle". The machine cycle is determined by the processing time of the stage with the slowest processing speed.

Hazard will now be described. In pipeline processing, there are such situations that instructions cannot be executed in an appropriate machine cycle. Such situations are called hazards. Hazards cause pipeline stalls. Generation of pipeline stalls trigger degradation in processor performance. Data hazard, which is one of the hazards, will now be described.

In pipeline processing, since executions of instructions overlap, relative execution timings of the instructions will be changed. This causes a hazard called data hazard. Data hazard is caused when orders of access to an operand are different between consecutive execution and pipelined execution of an instruction. Consider one example in which the execution process of an instruction has the five steps of (1) instruction fetch stage IF, (2) instruction decoding stage ID, (3) execution stage EX, (4) memory access stage MEM and (5) write back stage WB. It is also assumed that a new instruction is fetched per clock cycle. Furthermore, as for the instruction, assume an arithmetic instruction. In the first, instruction fetch stage IF, the instruction is fetched from an instruction cache (not shown) to an instruction decoder (not shown). In the second, instruction decoding stage ID, the fetched instruction is decoded by the instruction decoder, and according to the decoded instruction, an operand is fetched from a resistor file (not shown). In the third, execution stage EX, the instruction is executed and the operation is performed on the operand. The operation result is maintained in a result buffer (not shown) in the execution stage EX. In the fourth, memory access stage MEM, the operation result maintained in the result buffer in the execution stage EX is maintained in a result buffer (not shown) in the memory access stage MEM. In the fifth, write back stage WB, the operation result maintained in the result buffer in the memory access stage MEM is written into the register file. Consider the case in which two arithmetic instructions (an addition instruction ADD and an subtraction instruction SUB) are pipelined.

ADD a1, a2, a3

SUB a4, a1, a5

In each of the addition instructions ADDs and the subtraction instruction SUB, the left indicates a destination address (an address of the register file for storing an operation result), and the center and the right indicate source addresses (addresses of the register file for storing operands). The destination address a1 of the addition instruction ADD is a source address a1 of the subtraction instruction SUB. In such a case, data hazard is caused.

FIG. 26 is a figure for explaining data hazard. Referring to FIG. 26, the addition instruction ADD exists in the instruction fetch stage IF at the first clock, in the instruction decoding stage ID at the second clock, in the execution stage EX at the third clock, in the memory access stage MEM at the fourth clock, and in the write back stage WB at the fifth clock. The subtraction instruction SUB exists in the instruction fetch stage IF at the second clock, in the instruction decoding stage ID at the third clock, in the execution stage EX at the fourth clock, in the memory access stage MEM at the fifth clock, and in the write back stage WB at the sixth clock. The addition instruction ADD writes its operation result into the register file in the write back stage WB (at the fifth clock) according to the destination address a1 (arrow A). Meanwhile, the subtraction instruction SUB fetches an operand from the register file in the instruction decoding stage ID (at the third clock) according to the source address a1 (arrow B). While the substraction instruction SUB uses the operation result of the addition instruction ADD, the operation result of the addition instruction ADD has not been written in the register file yet in the instruction decoding stage ID (at the third clock) at which the subtraction instruction SUB fetches the operand from the register file. Such a condition is called data hazard. If the data hazard is not avoided, the subtraction instruction SUB will fetch and use an inappropriate operand. That is, the subtraction instruction SUB will read out data from the address a1 of the register file before the operation result of the addition instruction ADD is written into the register file, so that the subtraction instruction SUB may be inappropriately processed.

Data hazard can be solved by a simple hardware technology called bypass. First, consider a processor including two latch circuits and an ALU (Arithmetic and Logic Unit) operating on two operands maintained in the two latch circuits. Furthermore, an operation result of the ALU is adapted to be fed back to the two latch circuit. Furthermore, when the operation result of the ALU is equal to an operand for another operation to be carried out in the ALU, not an operand read from the register file but the operation result in the ALU is adapted to be used as an input for another operation to be carried out in the ALU. Such a scheme is called a bypass scheme. A bypass scheme which solves data hazard is disclosed in "Computer Architecture: A Quantitative Approach," David A. Patterson, John L. Hennessy, MORGAN KAUFMANN PUBLISHERS, Inc., for example.

FIG. 27 illustrates a bypass scheme. Referring to FIG. 27, the top shows pipeline processing for an addition instruction ADD having a destination address a1 and source addresses a2 and a3. The middle shows pipeline processing for a subtraction instruction SUB having a destination address a4 and source addresses a1 and a5. The bottom shows pipeline processing for an addition instruction ADD having a destination address a6 and source addresses a1 and a7. In a five-stage pipeline configuration shown in FIG. 27, an operation result of the instruction (ADD a1, a2, a3) need be bypassed not only to the next instruction (SUB a4, a1, a5) to be input but also to the second next instruction (ADD a6, a1, a7) to be input. In the second half of the instruction decoding stage ID, an operand is fetched (i.e., data is read out) (R), and the operation result is written in the first half of the write back stage WB. Thus, the operation result of the instruction (ADD a1, a2, a3) need not be bypassed to an instruction input after the instruction (ADD a6, a1, a7), since the operation result of the instruction (ADD a1, a2, a3) has been written in the register file when the instruction input after the instruction (ADD a6, a1, a7) moves to the execution stage EX.

FIG. 28 is a schematic block diagram showing a conventional scalar processor having the bypass scheme. According to FIG. 28, the conventional scalar processor includes a register file 5, multiplexers 212 and 213, an ALU 215, result buffers 217 and 219, two latch circuits (not shown), and four comparators (not shown). The pipeline configuration is the above mentioned five-stage configuration.

Two result buffers 217 and 219 are provided for holding operation results of instructions until the instructions move to the write back stage WB. When an instruction which uses as an operand an operation result of a preceding instruction (i.e., an instruction executed earlier at ALU 215 by one or two instructions) enters the execution stage EX, the preceding instruction which generated the operation result serving as the operand has moved from the execution stage EX to the memory access stage MEM (in the case of the instruction executed at ALU 215 one instruction), or from the memory access stage MEM to the write back stage WB (in the case of the instruction executed earlier at ALU 215 by two instructions) (see FIG. 27).

Two operation results held in two result buffers 217 and 219 can serve as either of inputs for two ports of ALU 215 via two multiplexers 211 and 213. Multiplexers 211 and 213 are controlled by determining whether any of source addresses of an instruction to be moved to the execution stage EX is the same as any of the destination addresses of two preceding instructions. If any of the source addresses of the instruction to be moved to the execution stage EX is the same as any of the destination addresses of the preceding instructions, the multiplexers 211 and 213 are controlled such that an operand is input not from register file 5 but from a result buffer (result buffer 217 or 219) in which an operation result of the instruction having the destination address exists.

When source addresses of an instruction to be moved to the execution stage EX are the same as both of two destination addresses of two preceding instructions, multiplexers 211 and 213 are controlled such that an operation result of the instruction executed earlier at ALU 215 by one instruction is input as an operand from result buffer 217. The inputting of an operand from a result buffer in which an operation result of the latest instruction of two preceding instructions exists when source addresses are the same as both of two destination addresses of the two preceding instructions, is referred to as priority selection.

Comparison of source addresses of an instruction to be moved to the execution stage EX with two destination addresses of two preceding instructions for controlling multiplexers 211 and 213 is carried out by two comparators. As two latch circuits and four comparators are provided, as described above, one latch circuit and two comparators are used for one source address since there are two source addresses. Since ALU 215 completes operation in one stage, the pipeline is not stalled for any combination of instructions as long as bypassing is provided.

An conventional parallel processor will now be described. As described above, the parallel processor is provided with a plurality of pipelines and starts executions of a plurality of instructions per clock cycle. For example, a plurality of operations are performed based on a plurality of arithmetic instructions in one clock cycle. Starting of execution of an instruction is also referred as issuing of an instruction. The VLIW (Very Long Instruction Word) processor is provided as a parallel processor. In the VLIW processor, a plurality of operations which is operable in parallel are assigned within one instruction. That is, a plurality of operations corresponding a plurality of scalar instructions are assigned to one instruction in the VLIW processor. Thus, a smaller number of the instructions for execution of one program is required in the VLIW processor than in a scalar processor. In the VLIW processor, the plurality of operations assigned to one instruction are executed using a plurality of independent functional units. The functional units include ALUs. In the VLIW processor, an instruction including the plurality of operations is referred to as "a basic instruction" and operations included in one basic instruction are simply referred as "instructions" hereinafter.

In the VLIW processor also, each functional unit is pipelined. This causes data hazard. For this reason, the bypass scheme is provided. In the VLIW processor, a large number of instructions are executed in parallel. Thus, its bypass control which determines which operation result should be bypassed is complicated. Consider an example in which the pipeline configuration of each functional unit is the above mentioned five-stage configuration. In this example, with a scaler processor, four comparators need be provided for comparing two destination addresses of two instructions existing in the execution stage EX and the memory access stage MEM with two source addresses of one instruction existing in the instruction decoding stage ID. Meanwhile, with the VLIW processor issuing four instructions, sixty-four comparators need be provided as it is provided with for functional units. That is, eight comparators need be provided for one source address.

Furthermore, the priority selection must be performed in order to bypass an operation result of the latest instruction. With the scalar processor, the priority selection may be performed among two operation results. However, with the VLIW processor issuing four instructions, which is provided with four functional units, the priority section must be performed among eight operation results.

Thus, in the conventional VLIW processor, as the number of instructions which can be issued in parallel increases, the number of the comparators required and hence the number of objects to which the priority selection is applied increase. Thus, as the number of instructions which can be issued in parallel increases, processing complexity increases exponentially. As processing is complicated, the time required for the processing increases. The machine cycle is determined depending on the processing time of a stage with the slowest processing speed. Thus, bypass control becomes time-consuming and hence the time required for processing at one stage is increased so that the machine cycle increases. The increase in the machine cycle directly affects processor performance, leading to degradation in processor performance.

Thus, in the VLIW processor as a conventional parallel processor, as the number of instructions which can be issued in parallel increases, processing is complicated and bypass control becomes time-consuming, resulting in degradation in performance.

SUMMARY OF THE INVENTION

The present invention is made to solve the problem described above and it contemplates a parallel processor capable of fast bypass control.

A parallel processor according to a first aspect of the present invention has a register file for storing therein a processing result of an instruction according to a destination address of the instruction. The parallel processor also processes a plurality of instructions included in one basic instruction in parallel. The parallel processor is provided with a plurality of functional units, a bypass circuit and a bypass control circuit. Each functional unit processes a corresponding instruction. Each functional unit also has a plurality of processing stages which pipelines the corresponding, successively input instructions. The bypass circuit is provided for selectively providing a plurality of processing results existing in the plurality of processing stages in the plurality of functional units to a plurality of the initial processing stages in the plurality of functional units. The bypass control circuit grasps in which processing stage of which functional unit an instruction having a destination address corresponding to an entry exists using a plurality of entries corresponding to a plurality of addresses of the register file. When a destination address of an instruction existing in any of the plurality of processing stages in the plurality of functional units matches with a source address of an instruction to be processed in the initial processing stage in a functional unit, bypass control circuit controls the bypass circuit such that a processing result of the instruction having the matching destination address is supplied from the processing stage in which the instruction having the matching destination address exists to the initial processing stage in which the instruction having the matching source address is to be processed. Furthermore, when an instruction having a destination address is grasped and a new instruction having the same destination address as the destination address is grasped input to any of the plurality of functional units, the bypass control circuit grasps the new, input instruction by an entry corresponding to the destination address.

Thus, a parallel processor according to the first aspect of the present invention grasps in which processing stage of which functional unit an instruction having a destination address corresponding to an entry exists by a plurality of entries corresponding to a plurality of addresses of a register file. Furthermore, when an instruction having a destination address is grasped and a new instruction having the same destination address as the destination address is input to any of the plurality of functional units, the new, input instruction is grasped by an entry corresponding to the destination address. This dispenses with a comparator for comparing addresses as well as the priority selection. Consequently, circuitry in the parallel processor according to the first aspect of the present invention is simplified, allowing fast bypass control.

A parallel processor according to a second aspect of the present invention has a register file for storing therein a processing result of an instruction according to a destination address of the instruction. The parallel processor processes a plurality of instructions included in one basic instruction in parallel. The parallel processor includes a plurality of functional units, a bypass circuit and a bypass control circuit. Each functional unit processes a corresponding instruction. Each functional unit also has a plurality of processing stages in which the corresponding, successively input instructions are pipelined. The bypass circuit is provided for selectively supplying a plurality of processing results existing in the plurality of processing stages in the plurality of functional units to a plurality of initial processing stages in the plurality of functional units. The bypass control circuit grasps in which functional unit an instruction having a destination address corresponding to an entry exists by a plurality of entries corresponding to a plurality of addresses of the register file. When a destination address of an instruction existing in any of the plurality of processing stages in the plurality of functional units matches with a source address of an instruction to be processed at initial processing stage of a functional unit, the bypass control circuit controls the bypass circuit such that a processing result of the instruction having the matching destination address from the processing stage in which the instruction having the matching destination address exists is supplied to the initial processing stage in which the instruction having the matching source address is to be processed. Furthermore, when an instruction having a destination address is grasped and a new instruction having the same destination address as the destination address is input to any of the plurality of functional units, the bypass control circuit grasps the new, input instruction by an entry corresponding to the destination address.

Thus, a parallel processor according to the second aspect of the present invention grasps in which functional unit an instruction having a destination address corresponding to an entry exists using a plurality of entries corresponding to a plurality of addresses of a register file. When an instruction having a destination address is grasped and a new instruction having the same destination address as the destination address is input to any of the plurality of functional units, the new, input instruction is grasped by an entry corresponding to the destination address. This reduces the number of comparators for comparing addresses as compared with conventional parallel processors. This also reduces the frequency of comparison for the priority selection as compared with conventional parallel processors. Consequently, fast bypass control can be achieved in the parallel processor according to the second aspect of the present invention.

A parallel processor according to a third aspect of the present invention has a register file for storing therein a processing result of an instruction according to a destination address of the instruction. The parallel processor processes a plurality of instructions included in one basic instruction in parallel. The parallel processor includes a plurality of functional units, a bypass circuit and a bypass control circuit. Each functional unit processes a corresponding instruction. Each functional unit also has a plurality of processing stages in which the corresponding, successively input instructions are pipelined. The bypass circuit is provided for selectively supplying a plurality of processing results existing in the plurality of processing stages in the plurality of functional units to a plurality of initial processing stages in the plurality of functional units. The bypass control circuit grasps in which processing stage an instruction having a destination address corresponding to an entry exists using a plurality of entries corresponding to a plurality of addresses of the register file. When a destination address of an instruction existing in any of the plurality of processing stages in the plurality of functional units matches with an source address of an instruction to be processed at the initial stage of a functional unit, the bypass control circuit controls the bypass circuit such that an processing result of the instruction having the matching destination address from the processing stage in which the instruction having the matching destination address exists is supplied to the initial processing stage in which the instruction having the matching source address exists. Furthermore, when an instruction having a destination address is grasped and a new instruction having the same destination as the destination address is input to any of the plurality of functional units, the bypass control circuit grasps the new, input instruction by a entry corresponding to the destination address.

Thus, a parallel processor according to the third aspect of the present invention grasps in which processing stage an instruction having a destination address corresponding to an entry exists by a plurality of entries corresponding to a plurality of addresses of the register file. When an instruction having a destination address is grasped and a new instruction having the same destination address as the destination address is input to any of a plurality of functional units, the new, input instruction is grasped by an entry corresponding to the destination address. Thus, the number of comparators for comparing addresses is reduced as compared with conventional parallel processors. Accordingly, the frequency of comparison for the priority selection is reduced as compared with conventional parallel processors. Consequently, fast bypass control is achieved in the parallel processor according to the third aspect of the present invention.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 shows correspondence of tristate buffers (FIG. 3) to control signals which controls the tristate buffers.

FIG. 26 illustrates data hazard in a conventional scalar processor.

FIG. 27 illustrates a bypass scheme in a conventional scalar processor.

DESCRIPTION OF THE PREFERRED EMBODIMENTS

A VLIW processor as a parallel processor according to the present invention will now be described with reference to the figures. As described above, the VLIW processor processes a plurality of instruction included in one basic instruction in parallel. The signals PIPE [0], PIPE [1], PIPE [2], PIPE [3], STAGE [0], STAGE [1] and STAGE [2] correspond to the PIPE (1), PIPE (2), PIPE (3), STAGE (0), STAGE (1) and STAGE (2) shown in the figures, respectively.

[FIRST EMBODIMENT]

Figure 1:
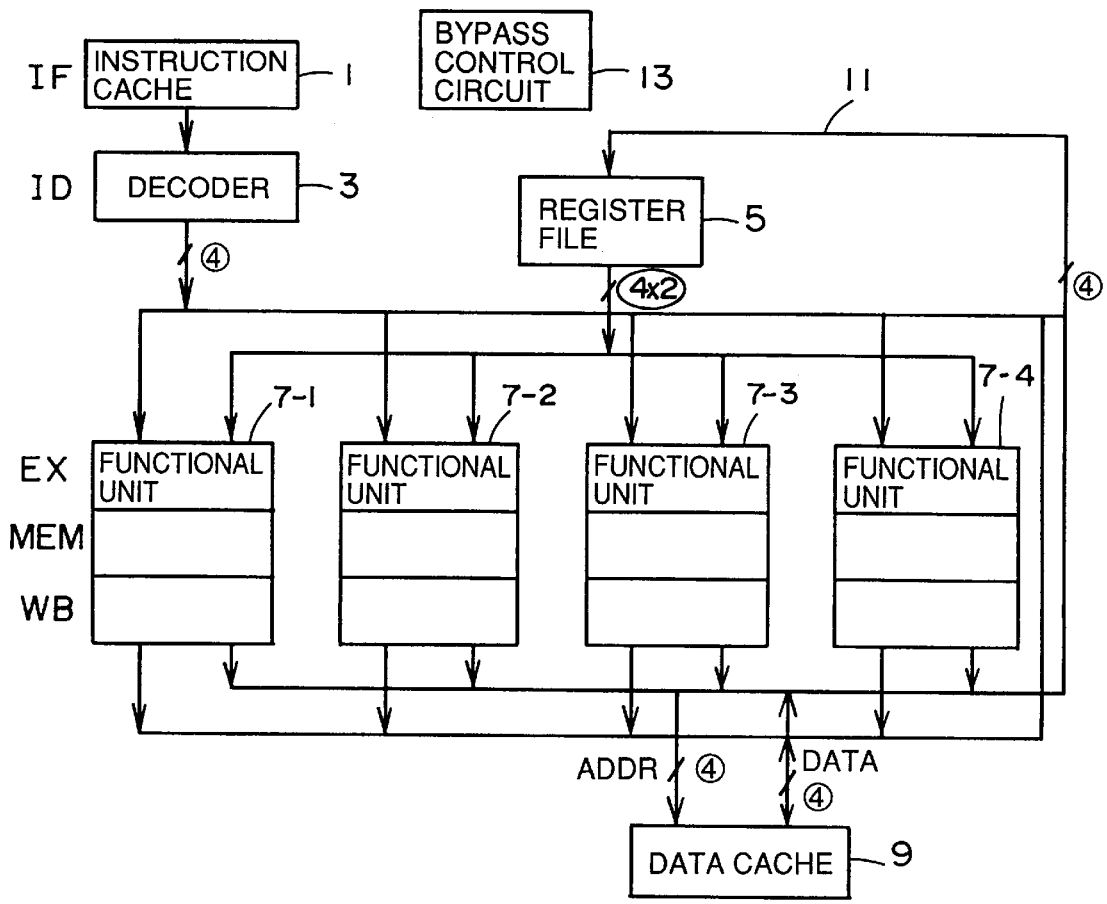
FIG. 1 is a schematic block diagram showing a VLIW processor according to a first embodiment of the present invention.

FIG. 1 is a schematic block diagram showing a VLIW processor according to a first embodiment of the present invention. Referring to FIG. 1, the VLIW processor according to the first embodiment of the present invention includes an instruction cache 1, a decoder 3, a register file 5, functional units 7-1, 7-2, 7-3, 7-4, a data cache 9, and a bypass control circuit 13. It is assumed that functional units 7-1 to 7-4 can execute any instruction. Eight data (i.e., eight operands) corresponding to source addresses of four instructions can be read out from register file 5 at one time. Furthermore, processing results of four instructions can be written into register file 5 via a bus 11 at one time, four data DATA can be written into data cache 9 at one time according to four addresses ADDRs. Furthermore, four data DATA can be read out from data cache 9 at one time according to four addresses ADDRs.

The pipeline processing will now be described. The pipeline configuration is a five-stage configuration. It is formed of the first, instruction fetch stage IF, the second, instruction decoding stage ID, the third, execution stage EX, the fourth, memory access stage MEM, and the fifth, write back stage WB. In the instruction fetch stage IF, a basic instruction is fetched (i.e., read out) from instruction cache 1. In the instruction decoding stage ID, the basic instruction is decoded by decoder 3. Four instructions included in the decoded basic instruction are input to and processed in four functional units 7-1 to 7-4.

Figure 2:
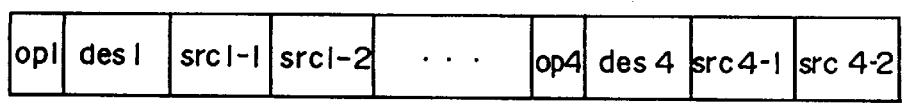
FIG. 2 shows a form of a basic instruction decoded at the instruction decoding stage ID of the VLIW processor shown in FIG. 1.

FIG. 2 is a schematic diagram showing a form of a decoded basic instruction. Referring to FIG. 2, the basic instruction is formed of: an instruction formed of an op code op1, a destination address des1 and source addresses src1-1, src1-2 (i.e., an instruction to be input to functional unit 7-1); an instruction formed of an op code op2, a destination address des2 and source addresses src2-1, src2-2 (i.e., an instruction to be input to functional unit 7-2); an instruction formed of an op code op3, a destination address des3 and source addresses src3-1, src3-2 (i.e., an instruction to be input to functional unit 7-3); and an instruction formed of an op code op4, a destination address des4 and source addresses src4-1, src4-2 (i.e., an instruction to be input to functional unit 7-4). The op codes op1-op4 indicate types of operations.

Referring again to FIG. 1, processings at the execution stage EX, memory access stage MEM and write back stage WB will now be described according to types of instructions. When an instruction is an arithmetic instruction, the arithmetic instruction is executed, that is, an operation is performed in the execution stage EX and its operation result (i.e., its processing result) is held in a result buffer (not shown) of the execution stage EX. In the memory access stage MEM, the operation result held in the result buffer of the execution stage EX is held in a result buffer (not shown) of the memory access stage MEM. In the write back stage WB, the operation result held in the result buffer of the memory access stage MEM is written into register file 5. When an instruction is a memory access instruction, an address is calculated and held in a result buffer of the execution stage EX in the execution stage EX. In the memory access stage MEM, data cache 9 or register file 5 is accessed according to the address held in the result buffer of the execution stage EX. When a memory access instruction is a loading instruction, data is read out from data cache 9 and held in a result buffer of the memory access stage MEM. When a memory access instruction is a storing instruction, data is read out from the register file 5 and held in a result buffer of the memory access stage MEM. In the write back stage WB, when a memory access instruction is a loading instruction, the data held in the result buffer of the memory access stage MEM is written into register file 5, and when a memory access instruction is a storing instruction, the data held in the result buffer of the memory access storage MEM is written into data cache 9.

In the instruction decoding stage ID register file 5 is accessed in order to obtain operands for their respective instructions. The obtained operands (i.e., data within register file 5) are supplied to their respective functional units 7-1 to 7-4 in the execution stage EX.

Figure 3:
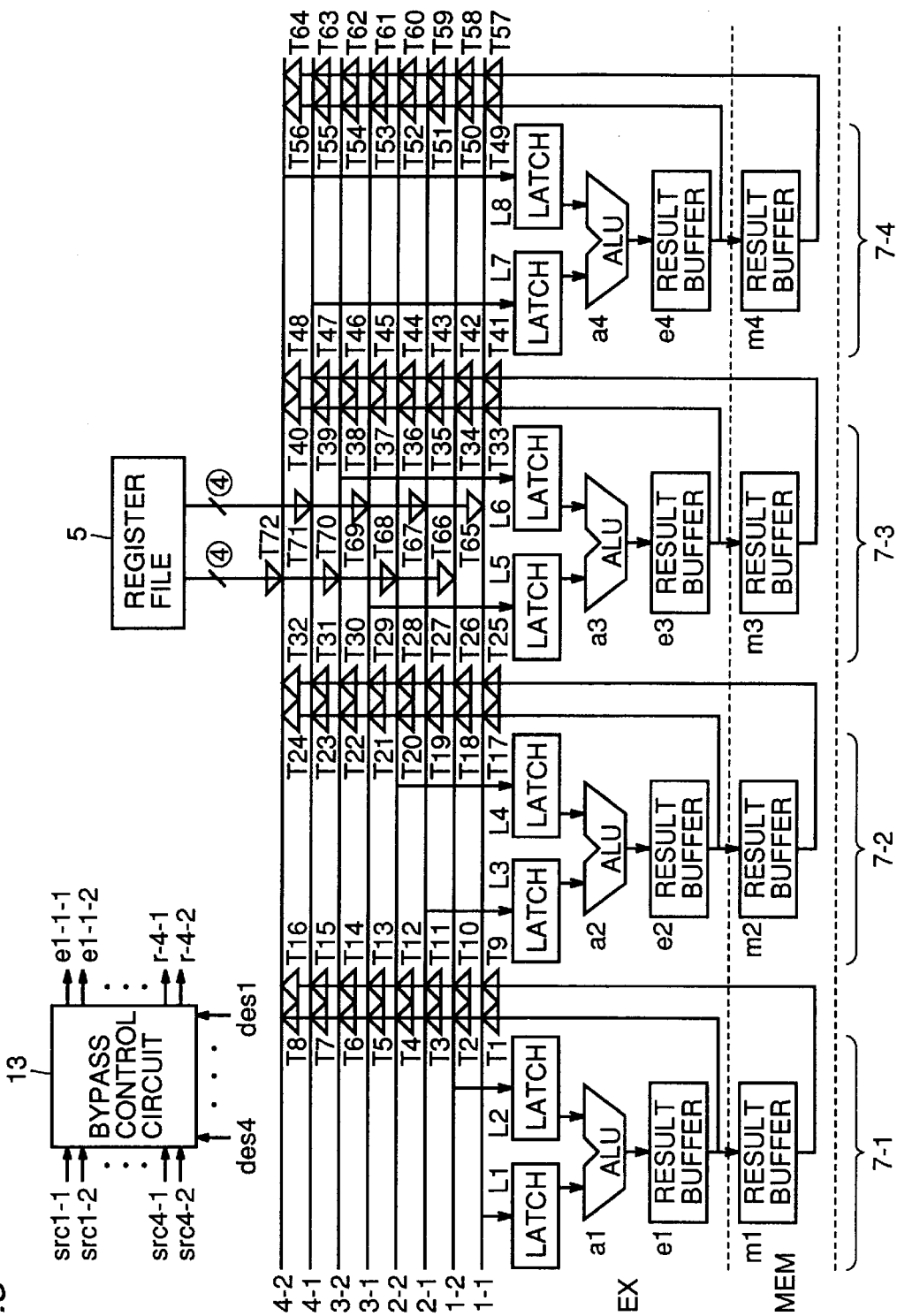
FIG. 3 is a schematic block diagram showing a portion of the VLIW processor of FIG. 1.

FIG. 3 is a schematic block diagram showing a portion of the VLIW processor of FIG. 1. Similar portions thereof to those shown in FIG. 1 are labeled by the same reference characters and the descriptions thereof are, where appropriate, not repeated.

Referring to FIG. 3, a portion of the VLIW processor of FIG. 1 includes a register file 5, a bypass control circuit 13, latch circuits L1–L8, ALUs a1–a4, result buffers e1–e4, m1–m4, tristate buffers T1–T72 and buses 1-1 to 4-2. Latch circuits L1 and L2, ALU a1, and result buffers e1 and m1 form functional unit 7-1. Latch circuit L3 and L4, ALU a2, and result buffers e2 and m2 form functional unit 7-2. Latch circuits L5 and L6, ALU a3, and result buffers e3 and m3 form functional unit 7-3. Latch circuits L7 and L8, ALU a4, and result buffers e4 and m4 form functional unit 7-4.

Latch circuit L1 connects with: result buffer e1 via bus 1-1 and tristate buffer T1; result buffer m1 via bus 1-1 and tristate buffer T9; result buffer e2 via bus 1-1 and tristate buffer T17; result buffer m2 via bus 1-1 and tristate buffer T25; result buffer e3 via bus 1-1 and tristate buffer T33; result buffer m3 via bus 1-1 and tristate buffer T41; result buffer e4 via bus 1-1 and tristate buffer T49; and result buffer m4 via bus 1-1 and tristate buffer T57.

Similarly, latch circuit L2 connects with result buffers e1, m1, e2, m2, e3, m3, e4 and m4 via bus 1-2 and tristate buffers T2, T10, T18, T26, T34, T42, T50 and T58. Similarly, latch circuit L3 connects with result buffers e1–e4, m1–m4 via bus 2-1 and tristate buffers T3, T11, T19, T27, T35, T43, T51 and T59. Latch circuit L4 similarly connects with result buffers e1–e4 and m1–m4 via bus 2-2 and tristate buffers T4, T12, T20, T28, T36, T44, T52 and T60. Latch circuit L5 similarly connects with result buffers e1–e4 and m1–m4 via bus 3-1 and tristate buffers T5, T13, T21, T29, T37, T45, T53 and T61. Latch circuit L6 similarly connects with result buffers e1–e4 and m1–m4 via bus 3-2 and tristate buffers T6, T14, T22, T30, T38, T46, T54 and T62. Latch circuit L7 similarly connects with result buffers e1–e4 and m1–m4 via bus 4-1 and tristate buffers T7, T15, T23, T31, T39, T47, T55 and T63. Latch circuit L8 similarly connects with result buffers e1–e4 and m1–m4 via bus 4-2 and tristate buffers T8, T16, T24, T32, T40, T48, T56 and T64.

Latch circuit L1 connects with register file 5 via bus 1-1 and tristate buffer T65. Latch circuit L2 connects with register file 5 via bus 1-2 and tristate buffer T66. Latch circuit L3 connects with register file 5 via bus 2-1 and tristate buffer T67. Latch circuit L4 connects with register file 5 via bus 2-2 and tristate buffer T68. Latch circuit L5 connects with register file 5 via bus 3-1 and tristate buffer T69. Latch circuit L6 connects with register file 5 via bus 3-2 and tristate buffer T70. Latch circuit L7 connects with register file 5 via bus 4-1 and tristate buffer L71. Latch circuit L8 connects with register file 5 via bus 4-2 and tristate buffer T72.

Tristate buffers T1–T72 are controlled to be turned on/off according to corresponding control signals e1-1-1 to r-4-2 from bypass control circuit 13.

When a tristate buffer is turned on by a corresponding control signal, data is transferred from a result buffer corresponding to the tristate buffer or from the register file to a latch circuit corresponding to the tristate buffer.

FIG. 4 shows correspondence between control signals e1-1-1 to r-4-2 generated by bypass control circuit 13 for controlling tristate buffers T1–T72 and tristate buffers T1–T72. Referring to FIG. 4, T1–T72 indicate tristate buffers T1–T72 shown in FIG. 2. Furthermore, in FIG. 4, "TSB" stands for "tristate buffer". E1-1-1 to r-4-2 indicate control signals for controlling tristate buffers T1–T72. In FIG. 4, a tristate buffer and a control signal indicated in one box correspond to each other. For example, tristate buffer T1 is controlled to be turned on/off by control signal e1-1-1.

Referring again to FIG. 3, bypass control will now be simply described. Source addresses of data required for latch circuits L1, L2, L3, L4, L5, L6, L7 and L8 are src1-1, src1-2, src2-1, src2-2, src3-1, src3-2, src4-1 and src4-2, respectively.

Bypass control circuit 13 grasps in which stage of which functional unit an instruction grasped by bypass control circuit 13 exists. When a destination address of an instruction existing in any of eight stages in four functional units 7-1 to 7-4 matches with any of source addresses src1-1 to src4-2 of instructions executed in the execution stage EX, bypass control circuit 13 transfers a processing result (i.e., an operation result) of the instruction having the matching destination address from a result buffer of a stage in which the instruction having the matching destination address exists to a latch circuit corresponding to the matching source address. That is, bypass control circuit 13 turns on a tristate buffer between a latch circuit corresponding to a matching source address and a result buffer of a stage in which an instruction having a matching destination address exists by a control signal.

On the other hand, when a source address does not match with any of destination addresses of instructions grasped by bypass control circuit 13, bypass control circuit 13 transfers data from register file 5 to a latch circuit corresponding to the source address according to the source address. That is, bypass control circuit 13 turns on a tristate buffer connected between a latch circuit corresponding to a source address which does not match with any of destination addresses of instructions grasped by bypass control circuit 13 and register file 5 by a control signal.

Referring to FIGS. 3 and 4, bypass control will be specifically described. An operation result (i.e., data) of ALU a4 held in result buffer e4 is assumed to match with a source address of data to be held in latch circuit L1. The matching is detected by bypass control circuit 13 and bypass control circuit 13 sets control signal e4-1-1 to "1". Control signal e4-1-1 thus set to "1" turns on tristate buffer T49. Thus, the operation result (i.e., data) of ALU a4 held in result buffer e4 is transferred to latch circuit L1 by bus 1-1.

In the VLIW processor, dissimilar to a scalar processor, eight operation results (i.e., eight data) held in eight result buffers e1–e4 and m1–m4 of four functional units 7-1 to 7-4 can serve as any of inputs of four ALUs a1–a4 of four functional units 7-1 to 7-4.

Figure 5:
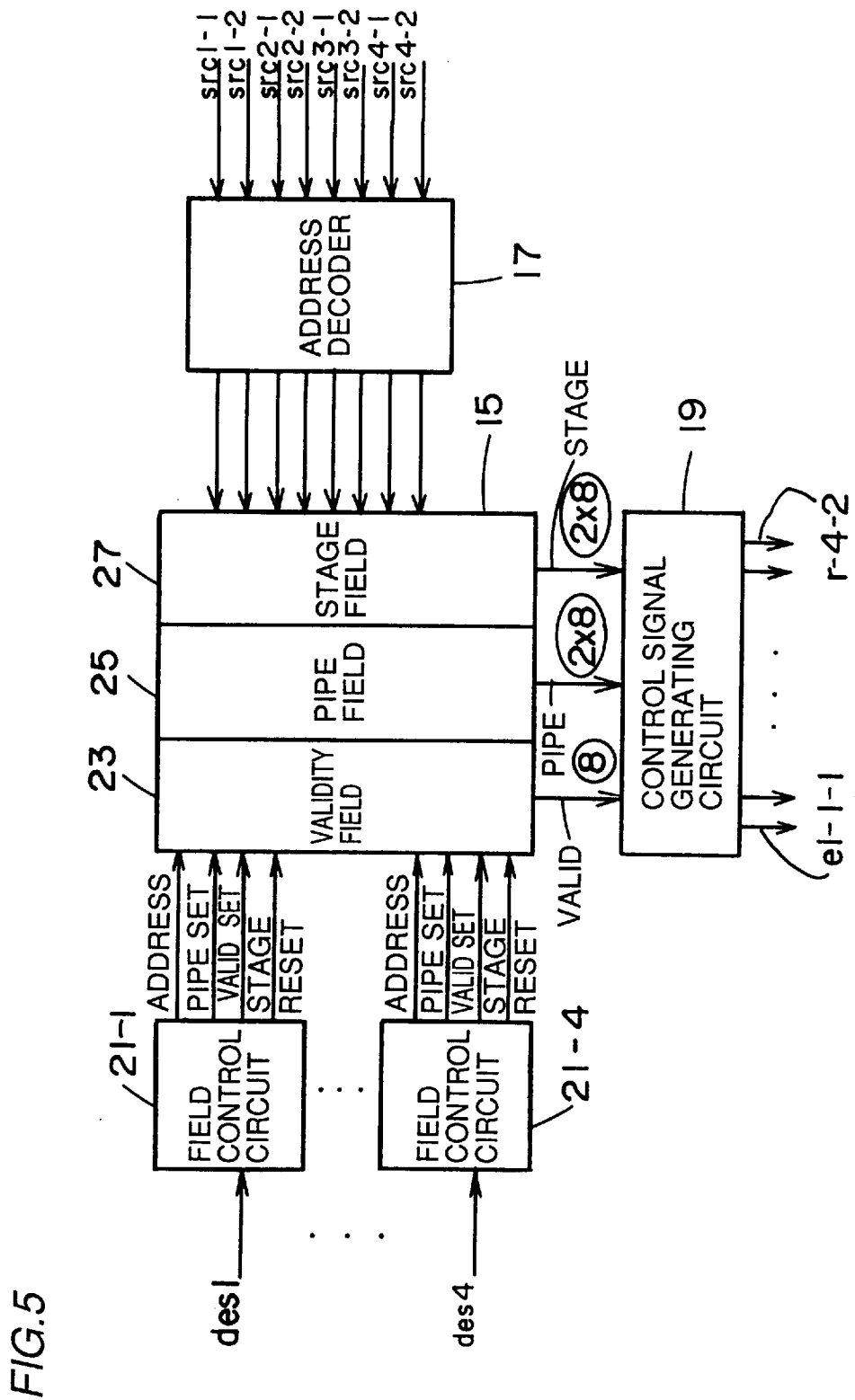
FIG. 5 is a schematic block diagram showing the bypass grasping circuit of FIG. 3.

FIG. 5 is a schematic block diagram showing bypass control circuit 13 of FIG. 3. Referring to FIG. 5, the bypass control circuit includes field control circuits 21-1, 21-2, 21-3, 21-4, an instruction grasping circuit 15, an address decoder 17, and a control signal generating circuit 19. Instruction grasping circuit 15 is formed of a field indicating validness/invalidness (referred to as "a validity field" hereinafter) 23, a functional unit field (referred to as "a pipe field" hereinafter) 25, and a stage field 27.

Figure 6:
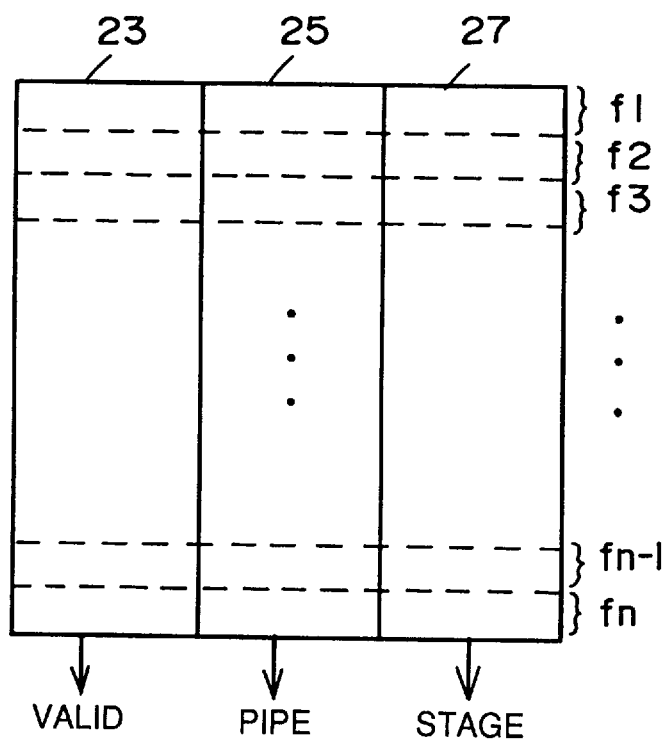
FIG. 6 is a schematic block diagram showing an instruction grasping circuit of FIG. 5.

FIG. 6 is a schematic block diagram showing instruction grasping circuit 15 of FIG. 5. Similar portions thereof to those shown in FIG. 5 are labeled by the same reference characters and the descriptions thereof are, where appropriate, not repeated. Referring to FIG. 6, the instruction grasping circuit is divided into a plurality of entries f1–fn. Entries f1–fn are provided corresponding to addresses of register file 5 of FIG. 3, and the number of the entries is equal to the number of addresses of register file 5 of FIG. 3. For example, an entry f1 corresponds to an address "1" of register file 5 of FIG. 3. Furthermore, since a destination address "1" indicates the address "1" of register file 5 of FIG. 3, the destination address "1" corresponds to the entry f1. Also, since a source address "1" indicates the address "1" of register file 5 of FIG. 3, the source address "1" corresponds to the entry f1.

Referring again to FIG. 5, field control circuit 21-1 receives a destination address des1 of an instruction to be input to functional unit 7-1. Then, field control circuit 21-1 generates a plurality of signals for updating data for an entry (see FIG. 6) corresponding to the received destination address des1. The plurality of signals are signals ADDRESS, PIPE SET, VALID SET and STAGE RESET. Field control circuits 21-2, 21-3 and 21-4 receive destination addresses des2, des3 and des4 of instructions to be input to functional units 7-2, 7-3 and 7-4, respectively. The operations of field control circuits 21-2 to 21-4 are similar to that of field control circuit 21-1.

Instruction grasping circuit 15 grasps in which stage of which functional unit an instruction having a destination address corresponding to an entry exists by the entry. That is, instruction grasping circuit 15 grasps in which result buffer of which functional unit a processing result (i.e., an operation result) of an instruction having a destination address corresponding to an entry currently exists by the entry. Validity field 23 indicates whether data in pipe field 25 and stage field 27 are valid or invalid. Pipe field 25 indicates in which functional unit an instruction having a destination address corresponding to an entry currently exists. That is, it indicates in which functional unit a processing result (i.e., an operation result) of an instruction having a destination address corresponding to an entry exists. Stage field 27 indicates in which stage an instruction having a destination address corresponding to an entry currently exists. That is, it indicates in which result buffer a processing result (i.e., an operation result) of an instruction having a destination address corresponding to an entry exists.

Validity field 23, pipe field 25 and stage field 27 are set or reset according to the plurality of signals generated by field control circuits 21-1 to 21-4. An signal ADDRESS determines an entry to be set or reset according to a destination address input to a field control circuit. That is, a signal ADDRESS is provided for selecting an entry corresponding to a destination address input to a field control circuit. A signal VALID SET sets validity field 23 for an entry according to a signal ADDRESS. This indicates that data in pipe field 25 and stage field 27 for the entry according to the signal ADDRESS are valid. A signal PIPE SET sets pipe field 25 for an entry according to a signal ADDRESS, that is, a signal PIPE SET sets pipe field 25 to indicate a functional unit to which an instruction having a destination address input to a field control circuit is input. A signal STAGE RESET resets stage field 27 for an entry according to a signal ADDRESS. Furthermore, stage field 27 for an entry according to a signal ADDRESS is newly set whenever an instruction having a destination corresponding to the entry moves to another stage, which will be described in detail later.

Address decoder 17 receives eight source addresses src1-1 to src4-2 of four instructions from decoder 3 of FIG.

1, and decodes them for transfer to instruction grasping circuit 15. Instruction grasping circuit 15 transfers data in fields (i.e., validity fields 23, pipe fields 25 and stage fields 27) for entries corresponding to the eight source addresses src1-1 to src4-2 transferred from address decoder 17 to control signal generating circuit 19. Since eight source addresses src1-1 to src4-2 are input, control signal generating circuit 19 receives eight one-bit data (i.e., eight signals VALIDs), eight two-bit data (i.e., eight signals PIPEs) and eight two-bit data (i.e., eight signals STAGEs) from validity field 23, pipe field 25 and stage field 27, respectively. Control signal generating circuit 19 generates control signals e1-1-1 to r-4-2 (see FIG. 4) controlling tristate buffers T1–T72 according to data input from the three fields 23, 25 and 27 of instruction grasping circuit 15.

Figure 7:
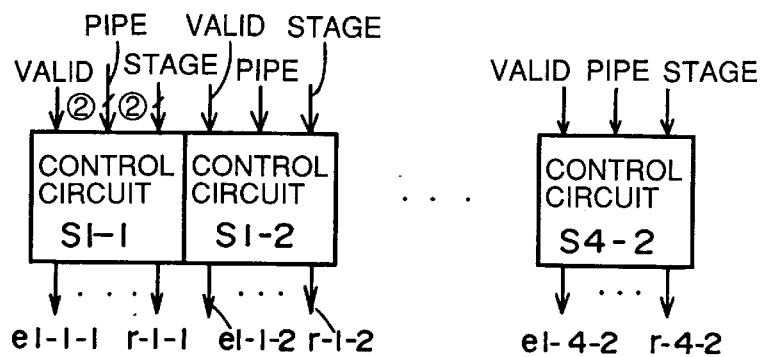
FIG. 7 is a schematic block diagram showing the control signal generating circuit of FIG. 5.

FIG. 7 is a schematic block diagram showing control signal generating circuit 19 of FIG. 5. Referring to FIG. 7, the control signal generating circuit includes eight control circuits S1-1, S1-2, S2-1, S2-2, S3-1, S3-2, S4-1 and S4-2. The eight control circuits S1-1 to S4-2 are provided corresponding to eight source addresses src1-1 to src4-2. For example, a control circuit S1-1 is provided corresponding to a source address src1-1. Control circuit S1-1 will now be specifically described with reference to FIGS. 3, 4, 5 and 7. Control circuit S1-1 receives three signals from three fields 23, 25 and 27 for an entry corresponding to source address src1-1. That is, it receives a one-bit signal VALID, a two-bit signal PIPE and a two-bit signal STAGE from validity field 23, pipe field 25 and stage field 27, respectively. The signal VALID indicates whether the signals PIPE and STAGE are valid or invalid. The signal PIPE indicates in which functional unit an instruction (i.e., a processing result of an instruction) having the same destination address as source address src1-1 exists. The signal STAGE indicates in which stage the instruction (the processing result of the instruction) having the same destination address as source address src1-1 exists. Control circuit S1-1 generates control signals e1-1-1 to e4-1-1, m1-1-1 to m4-1-1, and r1-1-1 for controlling tristate buffers T1, T9, T17, T25, T33, T41, T49, T57 and T65 connecting with bus 1-1, according to the signals VALID, PIPE and STAGE.

The operations of control circuits S1-2 to S4-2 are similar to that of control circuit S1-1. That is, the control circuit S1-2 is used corresponding to source address src1-2, and receives signals VALID, PIPE and STAGE from fields 23, 25 and 27 for an entry corresponding to source address src1-2. Then, control circuit S1-2 generates control signals e1-1-2 to e2-1-2, m1-1-2 to m4-1-2, and r1-1-2. Control circuit S2-1 is used corresponding to source address src2-1, and receives signals VALID, PIPE and STAGE from fields 23, 24 and 27 for an entry corresponding to source address src2-1. Then, control circuit S2-1 generates control signals e1-2-1 to e4-2-1, m1-2-1 to m4-2-1, and r-2-1. Control circuit S2-2 is used corresponding to source address src2-2, and receives signals VALID, PIPE and STAGE from fields 23, 25 and 27 for an entry corresponding to source address src2-2. Then, control circuit S2-2 generates control signals e1-2-2 to e4-2-2, m1-2-2 to m4-2-2, and r-2-2. Control circuit 3-1 is used corresponding to source address src3-1, and receives signals VALID, PIPE and STAGE from fields 23, 25 and 27 for an entry corresponding source address src3-1. Then, control circuit S3-1 generates control signals e1-3-1 to e4-3-1, m1-3-1 to m4-3-1, and r-3-1.

Control circuit S3-2 is used corresponding to source address src3-2, and receives signals VALID, PIPE and STAGE from fields 23, 25 and 27 for an entry corresponding to source address src3-2. Then control circuit S3-2 generates control signals e1-3-2 to e4-3-2, m1-3-2 to m4-3-2, and r-3-2. Control circuit S4-1 is used corresponding to source address src4-1, and receives signals VALID, PIPE and STAGE from fields 23, 24 and 27 for an entry corresponding to source address src4-1. Then control circuit S4-1 generates control signals e1-4-1 to e4-4-1, m1-4-1 to m4-4-1 and r-4-1. Control circuit S4-2 is used corresponding to source address src4-2, and receives signals VALID, PIPE and STAGE from fields 23, 24 and 27 for an entry corresponding to source address src4-2. Then control circuit S4-2 generates control signals e1-4-2 to e4-4-2, m1-4-2 to m4-4-2, and r4-2.

Figure 8:
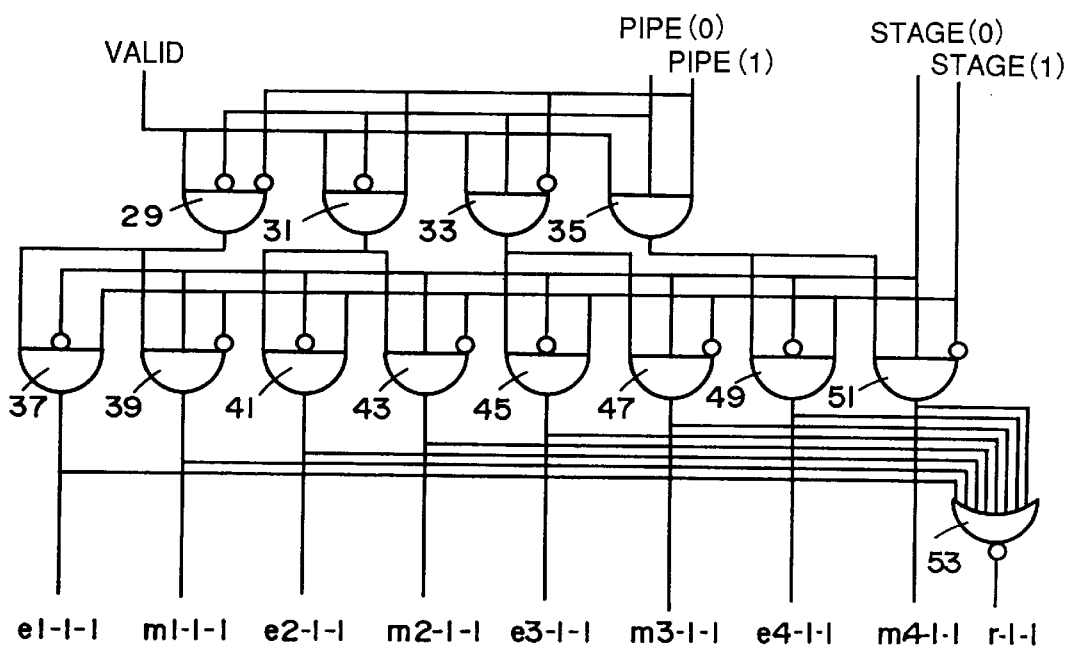
FIG. 8 is a circuit diagram showing the detail of control circuit S1-1 of FIG. 7.

FIG. 8 is a circuit diagram showing the detail of control circuit S1-1 of FIG. 7. Referring to FIG. 8, Control circuit S1-1 includes three-input AND circuits 29–51 and an NOR circuit 53. The circles added to inputs of AND circuits 29–33 and 37–51 indicates that inverted signals are input to the AND circuits. A signal PIPE [0] indicates the first bit of a two-bit signal PIPE, and a signal PIPE [1] indicates the second bit of the two-bit signal PIPE. A signal STAGE [0] indicates the first bit of a two-bit signal STAGE and a signal STAGE [1] indicates the second bit of the two-bit signal STAGE.

AND circuits 29–35 receives signals VALID, PIPE [0] and PIPE [1]. AND circuits 37–51 receives signals STAGE [0] and STAGE [1]. AND circuits 37 and 39 receive an output signal from AND circuit 29. AND circuits 41 and 43 receive an output signal from AND circuit 31. AND circuits 45 and 47 receive an output signal from AND circuit 33. AND circuit 49 and 51 receive an output signal from AND circuit 35. NOR circuit 53 receives output signals from AND circuits 37–51.

AND circuits 29–35 are provided for identifying the functional units. That is, AND circuits 29–35 are provided for identifying a functional unit in which an instruction (i.e., a processing result of an instruction) grasped by using an entry corresponding to source address src1-1 exists. When data in pipe field 25 and stage field 27 for the entry corresponding to source address src1-1 are valid, that is, when signals PIPE [0], PIPE [1], STAGE [0] and STAGE [1] are valid, the signal VALID is "1". AND circuits 37–51 are provided for identifying the stages. That is, AND circuits 37–51 are provided for identifying a stage in which the instruction (i.e., the processing result of the instruction) grasped by using the entry corresponding to the source address src1-1 exists.

Thus, a functional unit and a stage in which an instruction having a destination address matching with source address src1-1 exists are identified by AND circuits 29–51. That is, a functional unit and a result buffer therein in which a processing result of an instruction having a destination address matching with source address src1-1 are identified. Then, control signals e1-1-1 to e4-1-1, m1-1-1 to m4-1-1 for turning on a tristate buffer connecting with bus 1-1 and corresponding to the identified result buffer are generated in order to transfer the processing result of the instruction held in the identified result buffer to latch circuit L1 via bus 1-1.

A specific example will now be described with reference to FIGS. 3 and 8. It is assumed that signals PIPE "0", PIPE "1", PIPE "2" and PIPE "3" indicate functional units 7-1, 7-2, 7-3 and 7-4, respectively. It is also assumed that signals STAGE "0", STAGE "1", STAGE "2" and STAGE "3" indicate instruction decoding stage ID, execution stage EX, memory access stage MEM and write back stage WB, respectively. When the signals PIPE and STAGE are "0" and "1", respectively, they indicate that an instruction (i.e., a processing result of an instruction) having a destination address matching with source address src1-1 exists in result buffer e1 of the execution stage EX in functional unit 7-1. Therefore, tristate buffer T1 need be turned on to bypass a processing result of the instruction stored in result buffer e1 to latch circuit L1. Since the signal PIPE is "0", the signals PIPE [0] and PIPE [1] are "0"s. Accordingly, when the signal VALID is "1", the output of only AND circuit 29 is set to "1". Furthermore, since the signal STAGE is "1", the signals STAGE[0] and STAGE [1] are "0" and "1", respectively. Thus, the output of only AND circuit 37 is set to "1". That is, only control signal e1-1-1 is set to "1". The control signal e1-1-1 which has been set to "1" turns on tristate buffer T1.

When data in pipe field 25 and stage field 27 for the entry corresponding to source address src1-l are invalid, that is, when signals PIPE [0] PIPE [1], STAGE [0] and STAGE [1] are invalid, the signal VALID is "0". The invalidness of data in pipe field 25 and stage field 27 for the entry corresponding to source address src1-1 means that a processing result of an instruction having a destination address matching with source address src1-1 does not exist in any of the result buffers of any of the functional units. In such a case, therefore, data corresponding to source address src1-1 need be read out from register file 5 to latch circuit L1. That is, a control signal which turns on tristate buffer T65 need be generated. Since the signal VALID is "0", output signals of AND circuits 29–35 are all set to "0"s, which in turn sets all of the output signals of AND circuits 37–51 to "0"s. Accordingly, an output signal of only AND circuit 53 is set to "1". That is, only control signal r-1-1 is set to "1" and tristate buffer T65 turns on. The configurations of control circuits S1-2 to S4-2 of FIG. 7 are similar to that of control circuit S1-1 shown in FIG. 8.

Figure 9:
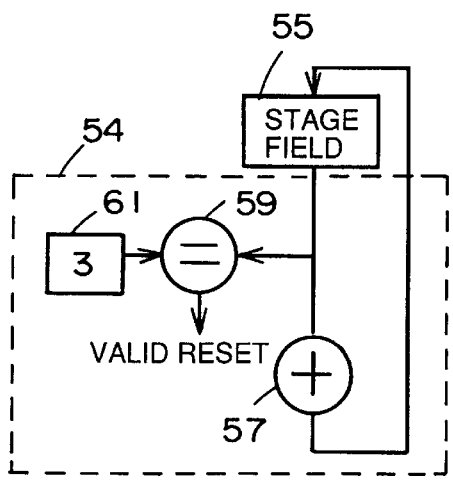
FIG. 9 is a schematic block diagram showing a portion of a stage field (FIG. 5) and a stage field control circuit controlling a portion of the stage field.

FIG. 9 is a schematic block diagram showing a portion of stage field 27 of FIG. 5 and a stage field control circuit for controlling a portion of stage field 27. Referring to FIG. 9, a stage field 55 corresponds to one entry in stage field 27 of FIG. 5. That is, stage field 55 is the stage field for one entry. Furthermore, a stage field control circuit 54 is provided corresponding to stage field 55. That is, instruction grasping circuit 15 (FIG. 6) is provided with a plurality of stage field control circuits 54 corresponding to a plurality of entries f1–fn.

Stage field control circuit 54 includes an adder 57, a data comparator 59 and a reference circuit 61.

Stage field 55 for an entry is provided for indicating in which stage an instruction having a destination address corresponding to the entry exists. That is, stage field 55 for an entry is provided for indicating in which result buffer a processing result of an instruction having a destination address corresponding to the entry exists. When stage field 55 is in an initial state or is reset by a signal STAGE RESET, stage field 55 is "0". That is, when an instruction having a destination address corresponding to an entry exists in the instruction decoding stage ID, stage field 55 for the entry is "0". When an instruction having a destination address corresponding to an entry exists in the execution stage EX, that is, when a processing result of an instruction having a destination address corresponding to an entry exists in a result buffer of the execution stage EX, stage field 55 of the entry is "1". When an instruction having a destination address corresponding to an entry exists in the memory access stage MEM, that is, when a processing result of an instruction having a destination address corresponding to an entry exists in a result buffer of the memory access stage MEM, stage field 55 for the entry is "2". When an instruction having a destination address corresponding to an entry exists in the write back stage WB, that is, when a processing result of an instruction having a destination address corresponding to an entry exists in the write back stage WB, stage field 55 for the entry is "3".

It is stage field control circuit 54 that thus sets (i.e., updates) data in stage field 55. "1" is added to a value of stage field 55 by adder 57 per clock cycle, that is, when an instruction moves to another stage. Then, the added value is stored in stage field 55. Data comparator 59 compares the value in stage field 55 with a value "3" stored in reference circuit 61. When the value in stage field 55 is "3", data comparator 59 generates a signal VALID RESET. That is, when an instruction moves to the write back stage WB, a signal VALID RESET is output from data comparator 59 and a validity field for an entry corresponding to stage field control circuit 54 is reset. The reset field indicates that the pipe field and stage field for the entry are invalid. The reason why a signal VALID RESET is output when an instruction exists in the write back stage WB is that bypass is not required and that data may be read out directly from register file 5.

Referring again to FIGS. 3, 5 and 6, setting or resetting of instruction grasping circuit 15 will be specifically described. When a destination address des1 of an instruction to be input to functional unit 7-1 is assumed to be "1", field control circuit 21-1 sets an signal ADDRESS to "1". The signal ADDRESS "1" selects an entry f1 corresponding to the destination address des1 "1". That is, three fields 23, 25 and 27 for the selected entry f1 are set or reset. Then, field control circuit 21-1 generates a signal VALID SET for setting validity field 23 for entry f1 to "1". When validity field 23 is "1", it indicates that data in pipe field 25 and stage field 27 are valid. When validity field 23 is "0", data in pipe field 25 and stage field 27 are invalid.

Furthermore, field control circuit 21-1 generates a signal PIPE SET for setting pipe field 25 for entry f1 to "0". Pipe fields 25 "0", "1", "2" and "3" indicate functional units 7-1, 7-2, 7-3 and 7-4, respectively. Furthermore, field control circuit 21-1 generates a signal STAGE RESET for resetting stage field 27 for entry f1. When the signal STAGE RESET is input to stage field 27, stage 27 is set to "0". Stage fields 27 "0", "1", "2" and "3" indicate that an instruction exists in instruction decoding stage ID, execution stage EX, memory access stage MEM and write back stage WB, respectively.

Referring now to FIGS. 3, 5, 7, 8 and 6, bypass control performed by bypass control circuit 13 will be described more specifically. Source address src1-1 input to address decoder 17 is assumed to be "2". Address decoder 17 reads out an entry f2 for instruction grasping circuit 15 corresponding to source address src1-1 "2", and transmits data of validity field 23, pipe field 25 and stage field 27 for entry f2 corresponding to source address src1-1 "2" to control signal generating circuit 19. That is, signals VALID, PIPE and STAGE are input to control circuit S1-1 from validity field 23, pipe field 25 and stage field 27, respectively. When the signals VALID, PIPE and STAGE are all "1"s, that is, when an instruction (i.e., a processing result of an instruction) having a destination address matching with a source address src1-1 exists in result buffer e2 in functional unit 7-2, the output of only AND circuit 31 (FIG. 8) is set to "1" since the signals VALID, PIPE [0] and PIPE [1] are "1", "0" and "1", respectively, and the output of only AND circuit 41 is set to "1" since the signals STAGE [0] and STAGE [1] are "0" and "1", respectively. That is, only control signal e2-1-1 is set to "1". Thus, tristate buffer T17 of FIG. 3 turns on and the processing result of the instruction held in result buffer e2 is transferred to latch circuit S1-1 via bus 1-1.

Referring to FIGS. 5 and 6, the reason why the VLIW processor according to the first embodiment dispenses with the priority selection (i.e., comparison). With instruction grasping circuit 15 grasping an instruction by an entry, when an instruction having a destination address corresponding to the entry is input to any of functional units 7-1 to 7-4, that is, when a destination address corresponding to the entry is newly input to any of field control circuits 21-1 to 21-4, the newly input instruction is grasped by the entry. For example, when the destination address of the instruction currently grasped is "1" and the destination address of the next instruction to be input is also "1", overwriting is carried out at entry f1, since the entry corresponding to the destination address "1" is entry f1 only. Overwriting is thus performed in instruction grasping circuit 15 so that the priority selection is not required.

In the VLIW processor according to the first embodiment, as described above, a bypass control circuit controls bypass by grasping in which result buffer in which functional unit a processing result of an instruction exists. Thus, a comparator for comparing a destination address with a source address, and hence the priority selection are not required. Consequently, in the VLIW processor according to the first embodiment, the circuitry is simplified and fast bypass control can be achieved.

[SECOND EMBODIMENT]

The configuration of a VLIW processor as a parallel processor according to a second embodiment is similar to that of the VLIW processor according to the first embodiment shown in FIGS. 1 and 3. The form of a basic instruction decoded at the instruction decoding stage ID of the VLIW processor according to the second embodiment is similar to that shown in FIG. 2. Correspondence of tristate buffers T1–T72 to control signals e1-1-1 to r4-2 for controlling tristate buffers T1–72 in the VLIW processor according to the second embodiment is similar to that shown in FIG. 4. A bypass control circuit of the VLIW processor according to the second embodiment is similar to the bypass control circuit according to the first embodiment shown in FIG. 4.

An instruction grasping circuit of the VLIW processor according to the second embodiment is similar to that of the VLIW processor according to the first embodiment shown in FIG. 6, except for the following: in the instruction grasping circuit of the VLIW processor according to the first embodiment, four functional units 7-1 to 7-4 are represented in pipe field 25 using two bits. On the other hand, in the VLIW processor according to the second embodiment, four functional units 7-1 to 7-4 are represented in pipe field 25 by bit vector representation using four bits. For example, in the instruction grasping circuit of the VLIW processor according to the second embodiment, when the first bit of pipe field 25 is "1", it indicates that an instruction grasped exists in functional unit 7-1, when the second bit of pipe field 25 is "1", it indicates that an instruction grasped exists in functional unit 7-2, when the third bit of pipe field 25 is "1", it indicates that an instruction grasped exists in functional unit 7-3, and when the fourth bit of pipe field 25 is "1", it indicates that an instruction grasped exists in functional unit 7-4. Thus, in the VLIW processor according to the second embodiment, each functional unit is represented by bit vector representation the number of bits of which is equal to the number of functional units 7-1 to 7-4. Since the bit vector representation using four bits is used in pipe field 25 to represent each functional unit, the number of bits of a signal PIPE input from pipe field 25 to control signal generating circuit 19 (FIG. 5) is also four.

A control signal generating circuit of the VLIW processor according to the second embodiment is similar to that of the VLIW processor according to the first embodiment shown in FIG. 7, except for the following: as described above, since each of functional units 7-1 to 7-4 is represented in pipe field 25 (FIG. 6) using bit vector representation using four bits, a signal PIPE input from pipe field 25 to control circuits S1-1 to S4-2 is a four-bit signal. Accordingly, the specific circuit configuration of control circuit S1-1 to S4-2 of the VLIW processor according to the second embodiment differs from that of control circuits S1-1 to S4-2 of the VLIW processor according to the first embodiment shown in FIG. 8.

Figure 10:
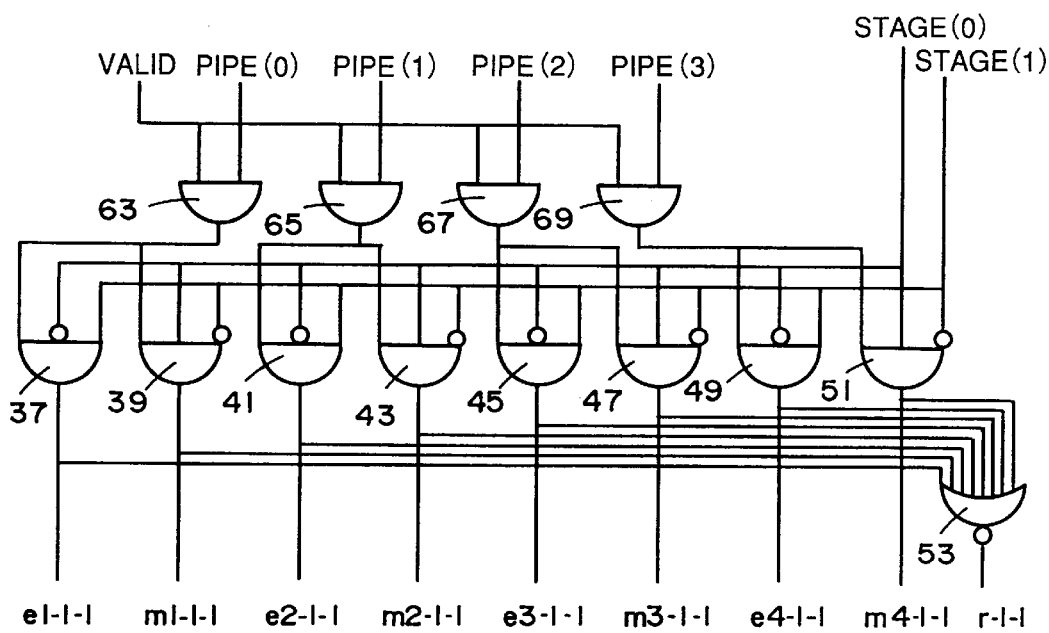
FIG. 10 is a circuit diagram showing the detail of control circuit S1-1 (FIG. 7) of a VLIW processor according to a second embodiment of the present invention.

FIG. 10 is a circuit diagram showing control circuit S1-1 (FIG. 7) of the VLIW processor according to the second embodiment in detail. Similar portions thereof to those shown in FIG. 8 are labeled by similar reference characters and the description thereof is, where appropriate, not repeated. Referring to FIG. 10, control circuit S1-1 includes AND circuits 63–69 and 37–51 and an NOR circuit 53. AND circuits 63–69 receive a signal VALID. AND circuits 63, 65, 67 and 69 receive signals PIPE [0], PIPE [1], PIPE [2] and PIPE [3], respectively.

Referring to FIG. 5 also, the signal PIPE [0] corresponds to the first bit of the pipe field, that is, it indicates the first bit of a signal PIPE; the signal PIPE [1] corresponds to the second bit of the pipe field, that is, it indicates the second bit of a signal PIPE; the signal PIPE [2] corresponds to the third bit of the pipe field, that is, it indicates the third bit of a signal PIPE; and the signal PIPE [3] corresponds to the fourth bit of the pipe field, that is, it indicates the fourth bit of a signal PIPE. That is, when the signal PIPE [0] is "1", an instruction (i.e., a processing result of an instruction) grasped exists in functional unit 7-1; when the signal PIPE [1] is "1", an instruction (a processing result of an instruction) grasped exists in functional unit 7-2; when signal PIPE [2] is "1", an instruction (a processing result of an instruction) grasped exists in functional unit 7-3; and when the signal PIPE [4] is "1", an instruction (a processing result of an instruction) grasped exists in functional unit 7-4. Thus, a functional unit in which an instruction grasped exists can be identified by AND circuits 63–69. The specific configuration of control circuits S1-1 to S4-2 is the same as that of control circuit S1-1 shown in FIG. 10.

A stage field and a stage field control circuit of the VLIW processor according to the second embodiment are similar to those according to the first embodiment shown in FIG. 9.

In the VLIW processor according to the second embodiment, as described above, four functional units 7-1 to 7-4 (FIG. 3) are represented in pipe field 25 (FIG. 5) of the bypass control circuit by bit vector representation using four bits. That is, a bit vector representation the number of bits of which is equal to that of the functional units is used to represent the functional units. Thus, the control circuit (FIG. 10) is more simplified than the control circuit (FIG. 8) of the VLIW processor according to the first embodiment. Consequently faster bypass control can be achieved in the VLIW processor according to the second embodiment than in that according to the first embodiment.

[THIRD EMBODIMENT]

The configuration of a VLIW processor as a parallel processor according to a third embodiment is similar to that according to the first embodiment shown in FIGS. 1 and 3. The form of a basic instruction decoded at the instruction decoding stage ID of the VLIW processor according to the third embodiment is similar to that shown in FIG. 2.

Correspondence of tristate buffers T1–72 of the VLIW processor according to the third embodiment to control signals e1-1-1 to r-4-2 is similar to that shown in FIG. 4. A bypass control circuit of the VLIW processor according to the fourth embodiment is similar to that according to the first embodiment shown in FIG. 5.

An instruction grasping circuit of the VLIW processor according to the third embodiment is similar to that according to the first embodiment shown in FIG. 6, except for the following: in stage field 27 of the VLIW processor according to the first embodiment, a stage in which an instruction grasped exists is represented by two bit. On the other hand, in stage field 27 of the instruction grasping circuit of the VLIW processor according to the third embodiment, a stage in which an instruction grasped exists is represented by bit vector representation using four bits. For example, the first bit of stage field 27 is set to "1" when an instruction exists in the instruction decoding stage ID, the second bit thereof is set to "1" when an instruction exists in the execution stage EX, the third bit thereof is set to "1" when an instruction exists in the memory access stage MEM, and the fourth bit thereof is set to "1" when an instruction exists in the write back stage WB. Since four stages are thus represented in stage field 27 using the bit vector representation using four bits, a signal STAGE input from stage field 27 to control signal generating circuit 19 (FIG. 5) is also a four-bit signal.

A control signal generating circuit of the VLIW processor according to the third embodiment is similar to that according to the first embodiment shown in FIG. 7, except for the following: as described above, since in the VLIW processor according to the third embodiment, four stages are represented in stage field 27 by bit vector representation using four bits, a signal STAGE input from stage field 27 to control circuits S1-1 to S4-2 is also a four-bit signal. Thus, the specific circuit configuration of control circuits S1-1 to S4-2 differs from that of control circuits S1-1 to S4-2 of the VLIW processor according to the first embodiment.

Figure 11:
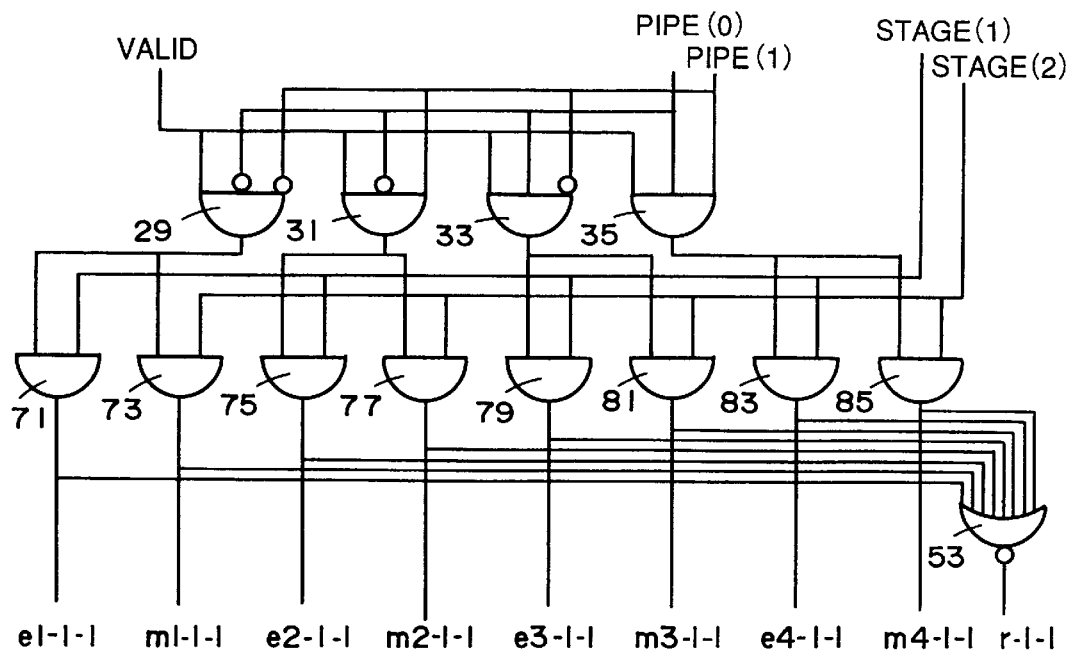
FIG. 11 is a circuit diagram showing the detail of control circuit S1-1 (FIG. 7) of a VLIW processor according to a third embodiment of the present invention.

FIG. 11 is a circuit diagram showing the detail of the control circuit (FIG. 7) of the VLIW processor according to the third embodiment of the present invention. Similar portions thereof to those shown in FIG. 8 are labeled by the same reference characters and the description thereof is, where appropriate, not repeated.

Referring to FIG. 11, control circuit S1-1 includes AND circuits 29–35 and 71–85 and an NOR circuit 53. AND circuits 71 and 73 receive an output signal from AND circuit 29. AND circuits 75 and 77 receive an output signal from AND circuit 31. AND circuits 79 and 81 receive an output signal from AND circuit 33. AND circuits 83 and 85 receive an output signal from AND circuit 35. AND circuits 71, 75, 79, 83 receive a signal STAGE [1]. AND circuits 73, 77, 81 and 85 receive a signal STAGE [2].

The signal STAGE [1] indicates the value of the second bit of stage field 27 (FIG. 5), i.e., the second bit of a signal STAGE. That is, the signal "STAGE [1] is the signal indicating whether an instruction grasped exists in the instruction execution stage EX. The signal STAGE [2] indicates the value of the third bit of stage field 27, i.e., the third bit of a signal STAGE. That is, the signal STAGE [2] is the signal indicating whether an instruction grasped exists in the memory access stage MEM. More specifically, when the signal STAGE [1] is "1", it indicates that an instruction grasped exists in the instruction execution stage EX. When the signal STAGE [2] is "1", it indicates that an instruction grasped exists in the memory access stage MEM. Since control circuit S1-1 contemplates bypassing processing results of instructions held in result buffers e1–e4 in the execution stage EX and in result buffers m1–m4 in the memory access stage MEM, signals STAGE [0] and STAGE [3] corresponding to the first and fourth bits of stage field 27, respectively, need not be input to control circuit S1-1. While AND circuits 37–51 shown in FIG. 8 (the first embodiment) for identifying the stages each have three input, AND circuits 71–85 shown in FIG. 11 for identifying the stages each have two input.

Referring to FIGS. 3 and 11, the operation will be specifically described. When a source address of data required by latch circuit L1 is assumed to match with a destination address of an processing result (i.e., data) of an instruction existing in result buffer e3, the signals VALID and PIPE [0] are "1" and the signal PIPE [1] is "0". Accordingly, the output signal of only AND circuit 33 is set to "1". Furthermore, as the signals STAGE [1] and STAGE [2] are "1" and "0", respectively, the output signal of only AND circuit 79 is set to "1". That is, only control signal e3-1-1 is set to "1". Accordingly, tristate buffer T33 turns on and the processing result of the instruction held in result buffer e3 is transferred to latch circuit L1.

When a source address of data to be input to latch circuit L1 does not match with any of eight destination addresses of processing results of eight instructions held in eight result buffers e1–e4 and m1–m4, the signal VALID is "0". Therefore, output signals of AND circuits 71–85 are all set to "0"s. Accordingly, the output of NOR circuit 53 is set to "1". That is, control signal r-1-1 is set to "1". Accordingly, tristate buffer T65 turns on, and data from the register file 5 is input to latch circuit L1. The circuit configuration of control circuits S1-2 to S4-2 is similar to that of the control circuit shown in FIG. 11.

Figure 12:
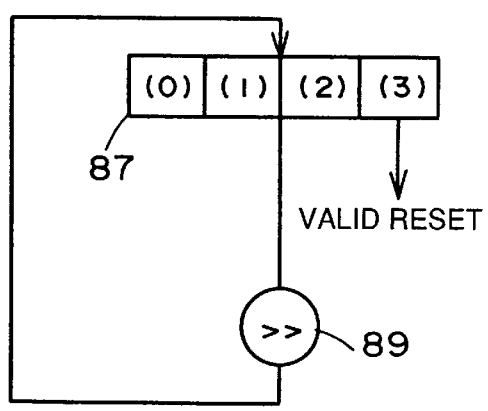
FIG. 12 is a schematic block diagram showing a portion of a stage field (FIG. 5) and a bit shifter controlling abortion of the stage field.

FIG. 12 is a schematic block diagram showing a portion of stage field 27 (FIG. 5) and a bit shifter controlling a portion of stage field 27 of the VLIW processor according to the third embodiment. Referring to FIG. 12, a portion 87 of a stage field is a portion of stage field 27 (FIG. 5) and corresponds to one entry. Thus, a bit shifter 89 provided corresponding to a portion 87 of the stage field also correspond to one entry. In a portion 87 of the stage field, the stages are identified by bit vector representation using four bits. Thus, bit shifter 89 sets the first bit [0] of a portion 87 of the stage field to "1" when an instruction exists in the instruction decoding stage ID, it sets the second bit [1] of a portion 87 of the stage field to "1" when an instruction exists in the execution stage EX, it sets the third bit [2] of a portion 87 of the stage field to "1" when an instruction exists in the memory access stage MEM, and it sets the fourth bit [3] of the portion 87 of the stage field to "1" when an instruction exists in the write back stage WB.

In other words, whenever an instruction moves to another stage, i.e., per clock cycle, bit shifter 89 sets the bit of the bit vector corresponding to the stage. For example, when an instruction exists in the execution stage EX, the bit vector of a portion 87 of the stage field is 0100. The signal VALID RESET for resetting validity field 23 (FIG. 5) may be generated when the instruction moves to the write back stage WB. Thus, the value of the fourth bit [3] of a portion 87 of the stage field is adapted to serve as the signal VALID RESET.

As described above, in the VLIW processor according to the third embodiment, the stages are represented by bit vector representation, that is, four stages are represented by bit vector representation using four bits. Thus, the control circuit (FIG. 11) and the circuit (bit shifter 89 shown in FIG.

12) controlling stage field 27 (FIG. 5) are simplified as compared with the control circuit (FIG. 8) and the circuit (stage field control circuit 54 shown in FIG. 9) controlling stage field 27 of the VLIW processor according to the first embodiment. Consequently, in the VLIW processor according to the third embodiment, still faster generation of control signals a1-1-1 to r-4-2 and the signal VALID RESET and hence faster bypass control can be achieved.

Furthermore, a characteristic portion of the VLIW processor according to the second embodiment may be combined with that of the VLIW processor according to the third embodiment. That is, four functional units 7-1 to 7-4 are represented by bit vector representation using four bits, and the four stages (instruction decoding stage ID, execution stage EX, memory access stage MEM and write back stage WB) are represented by bit vector representation using four bits. In such an example, the specific circuit configuration of a control circuits S1-1 to S4-2 (FIG. 7) is rendered different.

Figure 13:
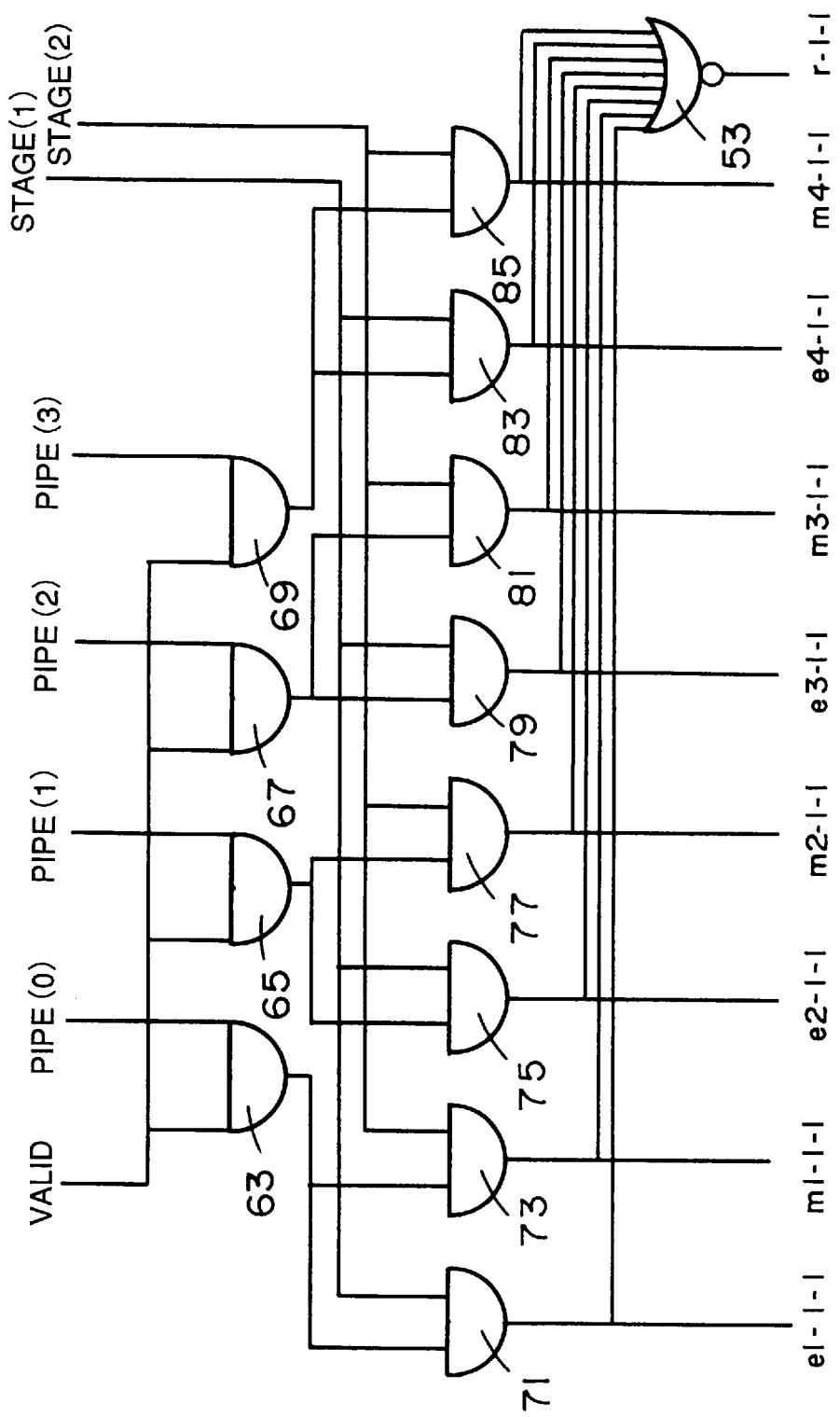
FIG. 13 is a circuit diagram showing the detail of control circuit S1-1 (FIG. 7) when a characteristic portion of a VLIW processor according to the second embodiment of the present invention is combined with that of a VLIW processor according to the third embodiment of the present invention.

FIG. 13 is a circuit diagram showing the detail of control circuit S1-1 (FIG. 7) when the characteristic portion of the VLIW processor according to the second embodiment is combined with that of the VLIW processor according to the third embodiment. Referring to FIG. 13, control circuit S1-1 includes AND circuits 63–69 and 71–85 and an NOR circuit 53. Similar portions thereof to those shown in FIGS. 10 and 11 are labeled by the same reference characters and the description thereof is, where appropriate, not repeated. The specific circuit configuration of control circuits S1-2 to S4-2 is also similar to that of control circuit S1-1 shown in FIG. 13. When the characteristic portion of the VLIW processor according to the second embodiment is thus combined with that of the VLIW processor according to the third embodiment, the control circuit is more simplified than the control circuit (FIG. 10) of the VLIW processor according to the second embodiment and the control circuit (FIG. 11) of the VLIW processor according to the third embodiment. Consequently, still faster bypass control can be achieved as compared with the VLIW processors according to the second and third embodiments.

[FOURTH EMBODIMENT]

The configuration of a VLIW processor as a parallel processor according to a fourth embodiment is similar to that of the VLIW processor according to the first embodiment shown in FIGS. 1 and 3. The form of a basic instruction decoded at the instruction decoding stage ID of the VLIW processor according to the fourth embodiment is similar to that shown in FIG. 2. Correspondence of tristate buffers T1–T72 of the VLIW processor according to the fourth embodiment to control signals e1-1-1 to r-4-2 is similar to that shown in FIG. 4.

Figure 14:
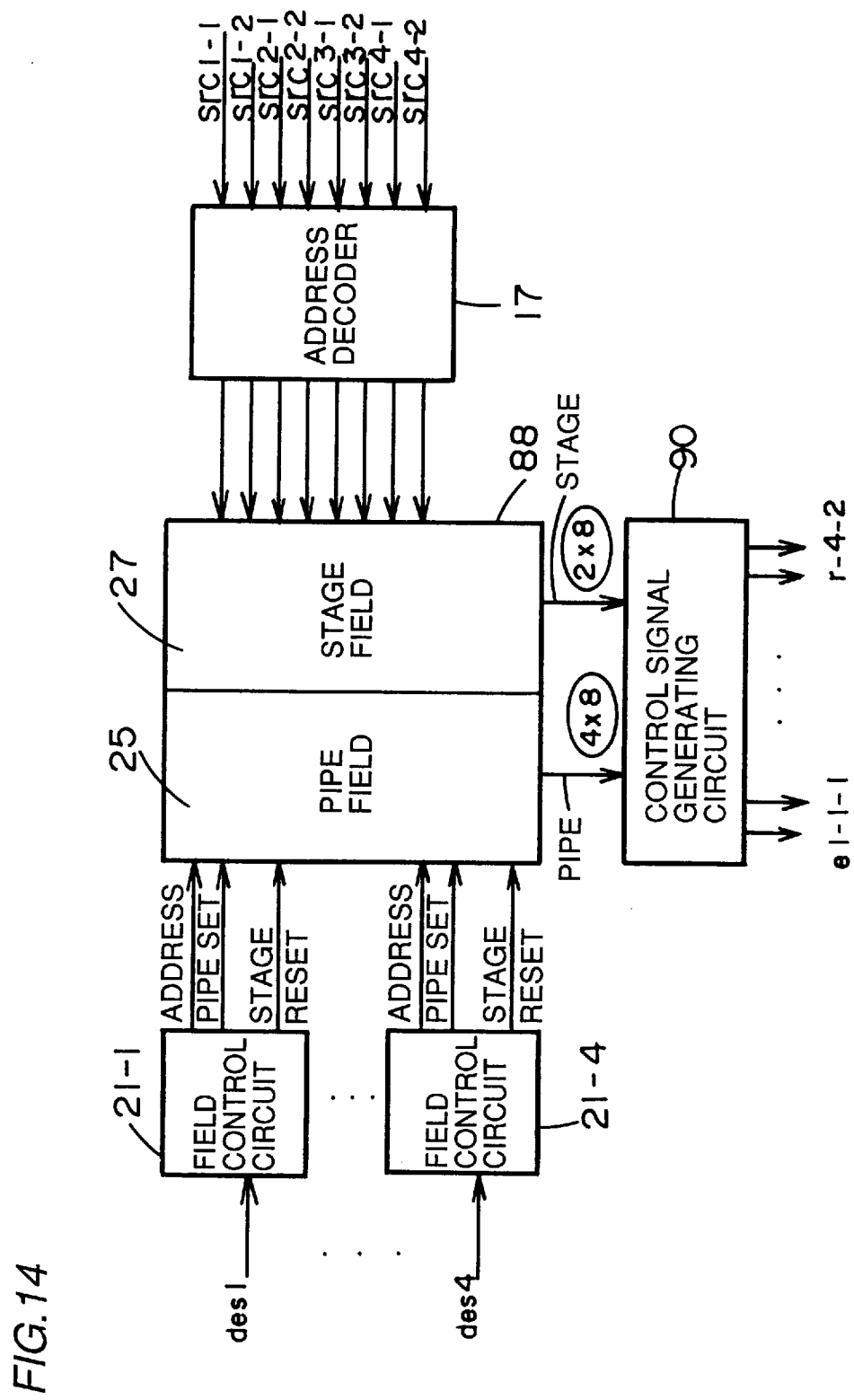
FIG. 14 is a schematic block diagram showing a bypass control circuit (FIG. 3) of a VLIW processor according to a fourth embodiment of the present invention.

FIG. 14 is a schematic block diagram showing bypass control circuit 13 (FIG. 3) of the VLIW processor according to the fourth embodiment. Similar portions thereof to those shown in FIG. 5 are labeled by the same reference characters and the description thereof is, where appropriate, not repeated. Referring to FIG. 14, the bypass control circuit includes field control circuits 21-1 to 21-4, an instruction grasping circuit 88, an address decoder 17 and a grasping signal generating circuits 90. Instruction grasping circuit 88 includes a functional unit field (referred to as "a pipe field" hereinafter) and a stage field 27.

The bypass control circuit shown in FIG. 5 differs from that shown in FIG. 14 in that the bypass control circuit shown in FIG. 14 does not have validity field 23 existing in the bypass control circuit of FIG. 5. In the bypass control circuit of the VLIW processor according to the fourth embodiment, validness/invalidness of data in pipe field 25 and stage field 27 is determined in the following manner.

Instruction grasping circuit 88 is divided into a plurality of entries f1–fn, similar to the instruction grasping circuit of FIG. 6.

Pipe field 25 is similar to that of the VLIW processor according to the second embodiment. That is, four functional units 7-1 to 7-4 are represented by bit vector representation using four bits. It is assumed that when any one of values of the first to fourth bits of the bit vector in pipe field 25 for an entry is "1", data in pipe field 25 and stage field 27 for the entry are valid. On the other hand, it is assumed that when values of the first to fourth bits of the bit vector in pipe field 25 for an entry are all "0"s, data in pipe field 25 and stage field 27 for the entry are invalid.

In such an example, initially all bits of the bit vector of pipe field 25 need be initialized to "0"s. Furthermore, when an instruction exists in the write back stage WB, all bits of the bit vector in pipe field 25 for an entry corresponding to a destination address of the instruction need be reset. This is because when an instruction (i.e., a processing result of an instruction) exists in the write back stage WB, data may be read out directly from the register file and hence bypassing is not required. Furthermore, the stage field control circuit controlling stage field 27 is similar to that shown in FIG. 9. Therefore, all bits of the bit vector in pipe field 25 are reset by the signal VALID RESET generated by stage field control circuit 54 shown in FIG. 9.

Since the functional units are represented in pipe field 25 by bit vector representation using four bits, four-bit signals PIPEs are accordingly input from pipe field 25 to control signal generating circuit 90. Since there are eight source addresses src1-1 to src4-2, eight four-bit signals PIPEs are input from pipe field 25 to control signal generating circuit 90.

Figure 15:
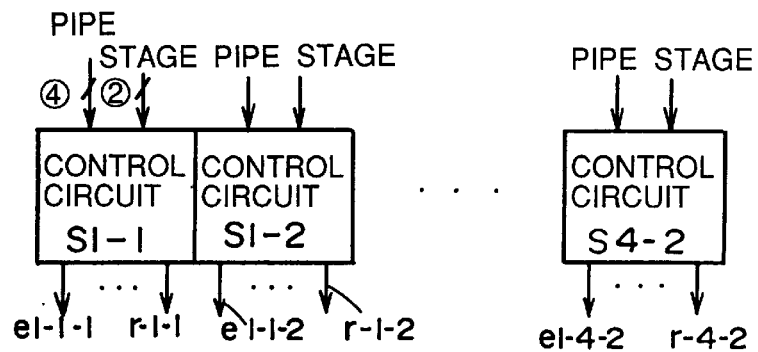
FIG. 15 is a schematic block diagram showing the control signal generating circuit of FIG. 14.

FIG. 15 is a schematic block diagram showing a control signal generating circuit 90 shown in FIG. 14. Similar portions thereof to those shown in FIG. 7 are labeled by the same reference characters and the description thereof is, where appropriate, not repeated. Referring to FIG. 15, control circuit S1-1 receives a four-bit signal PIPE and a two-bit signal STAGE. Responsively, control circuit S1-1 generates control signals e1-1-1 to e4-1-1, m1-1-1 to m4-1-1, and r-1-1. Control circuits S1-2 to S4-2 are similar to control circuit S1-1.

Figure 16:
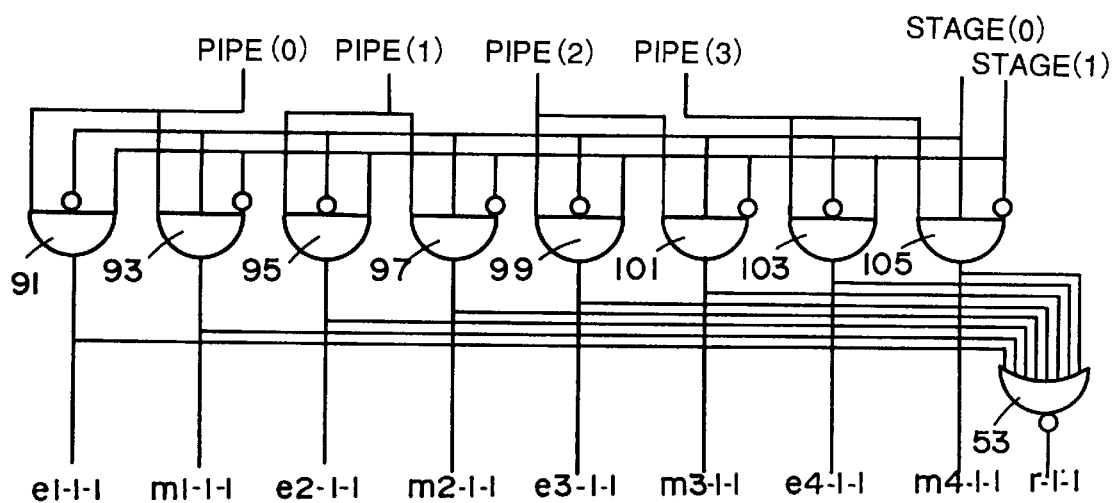
FIG. 16 is a circuit diagram showing the detail of the control circuit S1-1 of FIG. 15.

FIG. 16 is a circuit diagram showing the detail of control circuit S1-1 shown in FIG. 15. Referring to FIG. 16, control circuit S1-1 includes AND circuits 91–105 and an NOR circuits 53. AND circuits 91–105 receive signals STAGE [0] and STAGE [1]. AND circuits 91 and 93 receive a signal PIPE [0]. AND circuits 91 and 97 receive a signal PIPE [0]. AND circuits 95 and 97 receive a signal PIPE [1]. AND circuits 91 and 101 receive a signal PIPE [2]. AND circuits 103 and 105 receive a signal PIPE [3]. The signals PIPE [0], PIPE [1], PIPE [2] and PIPE [3] are similar to those shown in FIG. 10 (the second embodiment). The signals STAGE [0] and STAGE [1] are similar to those shown in FIG. 10.

The operation of control circuit S1-1 shown in FIG. 16 will now be described with further reference to FIG. 3. When a source address of data to be required by latch circuit 1 is assumed to match with a destination address of a processing result (i.e., data) of an instruction held in result buffer e3, the signals PIPE [0], PIPE [1] and PIPE [3] are "0"s and the signal PIPE [2] is "1", and the signals STAGE [0] and "STAGE [1] are "0" and "1", respectively. Thus, the output signal of only AND circuit 99 is set to "1". That is, only control signal e3-1-1 is set to "1". Thus, tristate buffer T33 turns on and the processing result of the instruction held in result buffer e3 is transferred to latch circuit L1.

When a source address of data to be required by latch circuit L1 does not match with any of the destination addresses of processing results (i.e., data) of instructions existing in result buffers e1–e4 and m1–m4, that is, when data in the pipe field and stage field for an entry corresponding to the source address of data to be required by latch circuit m1 are invalid, signals PIPE[0]–PIPE[3] are all set to "0"s. Therefore, output signals of AND circuits 91–105 are all set to "0"s. Thus, control signal r-1-1 output from NOR circuit 53 is set to "1". Responsively, tristate buffer T65 turns on and data is read out directly from register file 5 to latch circuit L1. The circuit configuration of control circuits S1-2 to S4-2 is similar to that of control circuit S1-1 shown in FIG. 16.

As described above, in the VLIW processor according to the fourth embodiment, the four functional units are represented in pipe field 25 by bit vector representation using four bits, and pipe field 25 performs the function of validity field 23 shown in FIG. 5. Thus, instruction grasping circuit 88 in the VLIW processor according to the fourth embodiment is more miniaturized than that according to the first embodiment (FIG. 5).

Furthermore, since pipe field 25 performs the function of validity field 23 shown in FIG. 5 in the VLIW processor according to the fourth embodiment by representing the four functional units using bit vector representation using four bits, there is no such signal VALID that is generated from validity field 23 as shown in FIG. 5. Thus, control circuits S1-1 to S4-2 are simplified as compared with control circuits S1-1 to S4-2 (FIG. 8) of the VLIW processor according to the first embodiment. As a result, still faster bypass control can be achieved in the VLIW processor according to the fourth embodiment than in that of the first embodiment.

Furthermore, the VLIW processor according to the fourth embodiment may be combined with a characteristic portion of the VLIW processor according to the third embodiment. That is, the four stages are represented in stage field 27 of the VLIW processor according to the fourth embodiment by bit vector representation using four bits. Thus, its control circuits S1-1 to S4-2 are more simplified than those shown in FIG. 16.

Figure 17:
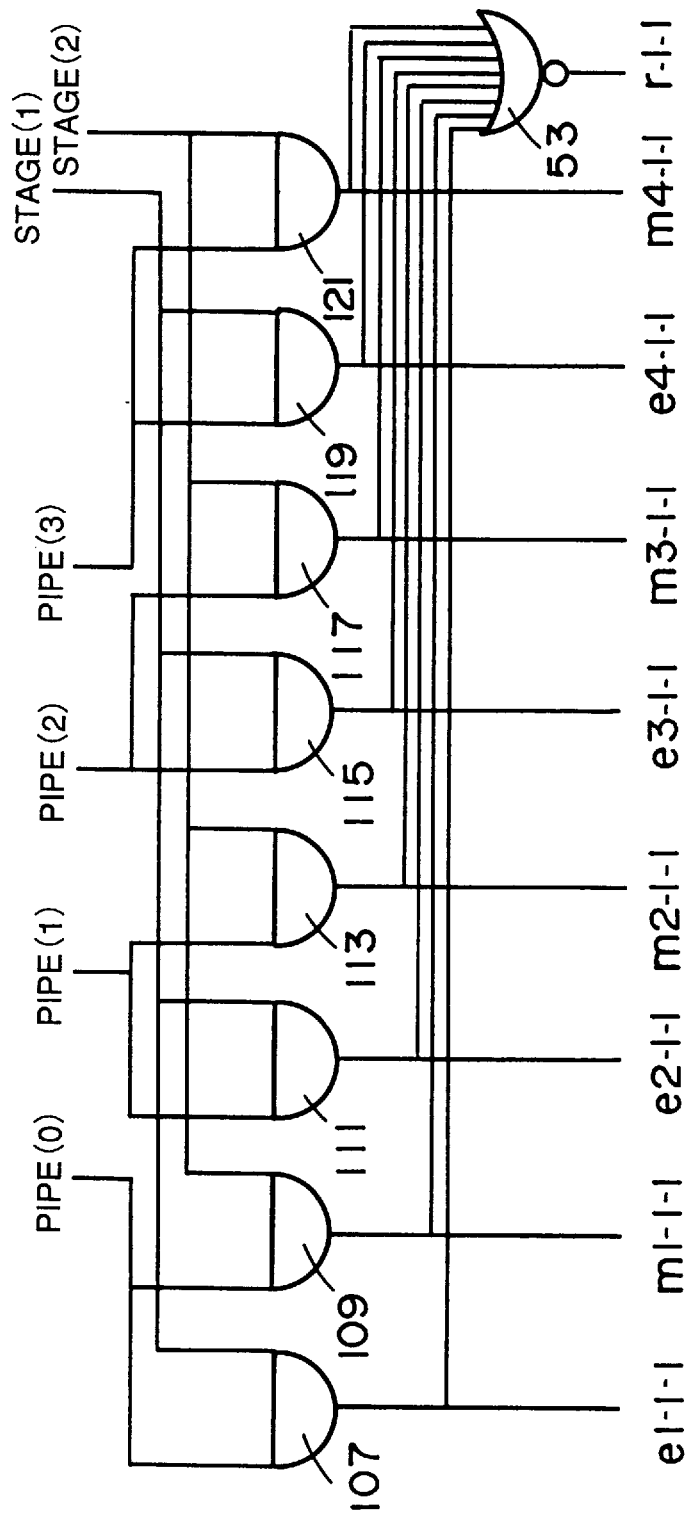
FIG. 17 is a circuit diagram showing the detail of control circuit S1-1 (FIG. 15) when characteristic portion of a VLIW processor according to the third emboediment of the present invention is combined with that of a VLIW processor according to the fourth embodiment of the present invention.

FIG. 17 is a circuit diagram showing the detail of control circuit S1-1 (FIG. 15) when the VLIW processor according to the fourth embodiment is combined with a characteristic portion of the VLIW processor according to the third embodiment. Similar portions thereof to those shown in FIG. 16 are labeled by the same reference characters and the description thereof is, where appropriate, not repeated. Referring to FIG. 17, control circuit S1-1 includes AND circuits 107–121 and an NOR circuit 53. AND circuits 107, 111, 115 and 119 receive a signal STAGE [1]. AND circuits 109, 113, 117 and 121 receive a signal STAGE [2]. The signals STAGE [1] and STAGE [2] are similar to those shown in FIG. 11, respectively.

The operation of control circuit S1-1 shown in FIG. 17 will be specifically described. A source address of data to be required by latch circuit L1 is assumed to match with a destination address of a processing result (i.e., data) of an instruction held in result buffer e3. In such an example, the signals PIPE [0], PIPE [1] and PIPE [3] are "0", and the signal PIPE [2] is "1". Furthermore, the signals STAGE [1] and STAGE [2] are "1" and "0", respectively. Therefore, the output signal of only AND circuit 115 is set to "1". That is, only control signal e3-1-1 is set to "1". Accordingly, tristate buffer T33 turns on and the processing results (i.e., the data) of the instruction held in result buffer e3 is transferred to latch circuit L1.

On the other hand, when a source address of data to be required by latch circuit L1 does not match with any of destination addresses of processing results (i.e., data) of eight instructions held in eight result buffers e1–e4 and m1–m4, that is, when data in pipe field 25 and stage field 27 for an entry corresponding to a source address of data to be required by latch circuit L1 are invalid, the signals PIPE [0]–PIPE [3] are all set to "0"s. Accordingly, output signals of AND circuits 107–121 are all set to "0"s. Accordingly, control signal r-1-1 output from NOR circuit 53 is set to "1". Thus, tristate buffer T65 turns on and data is directly read out from register file 5 to latch circuit L1. The circuit configuration of control circuits S1-2 to S4-2 is similar to that of control circuit S1-1 shown in FIG. 17.

Thus, when the VLIW processor according to the fourth embodiment is combined with the characteristic portion of the VLIW processor according to the third embodiment, the control circuits S1-1 to S4-2 (FIG. 17) are more simplified than those of the VLIW processor according to the fourth embodiment (FIG. 16). Consequently, when the VLIW processor according to the fourth embodiment is combined with the characteristic portion of the VLIW processor according to the third embodiment, faster bypass control can be achieved than in the VLIW processor according to the fourth embodiment.

[FIFTH EMBODIMENT]

The entire configuration of a VLIW processor as a parallel processor according to a fifth embodiment is similar to that of the VLIW processor according to the first embodiment shown in FIG. 1.

Figure 18:
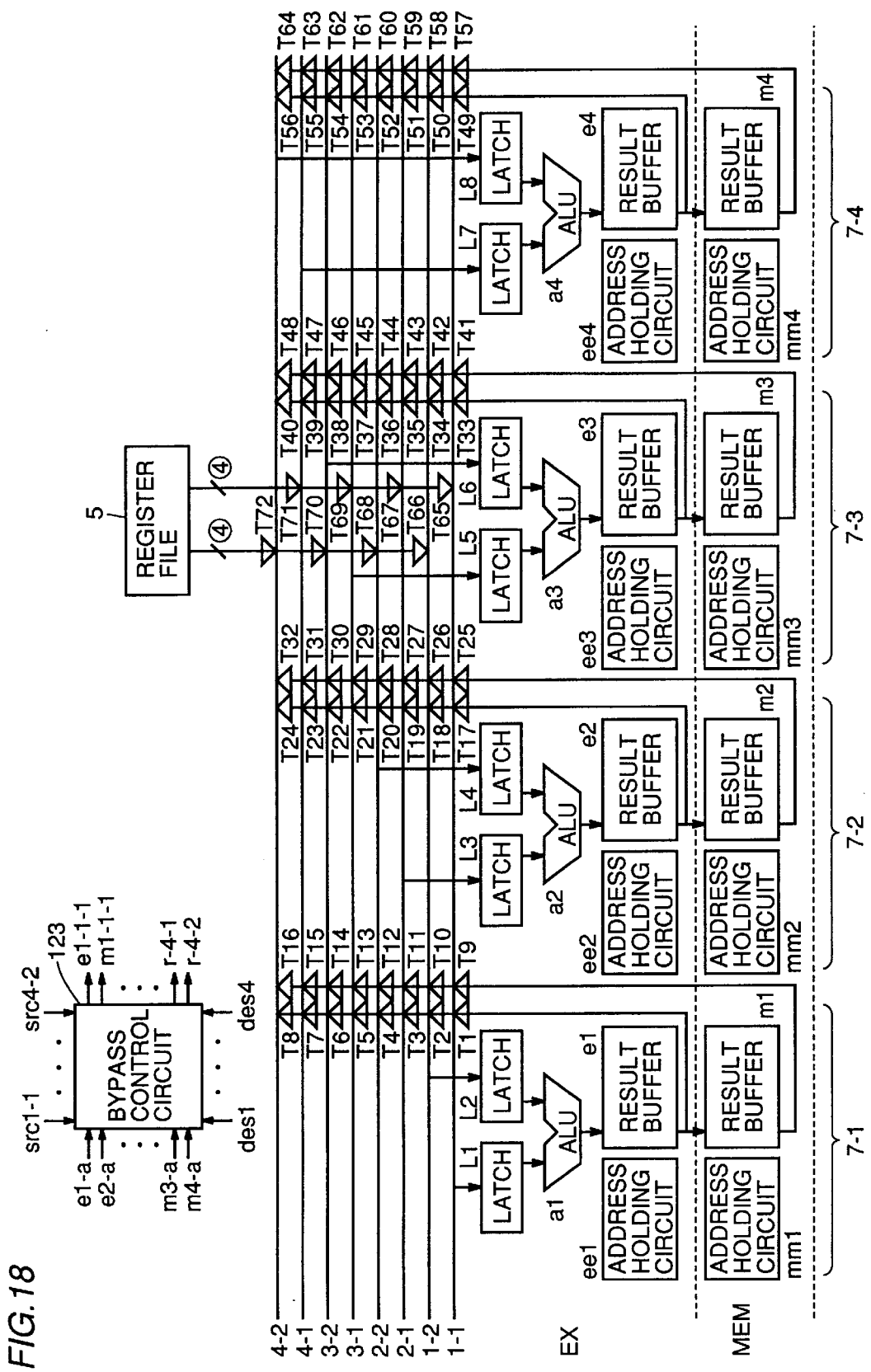
FIG. 18 is a schematic block diagram showing a portion of a VLIW processor according to a fifth embodiment of the present invention.

FIG. 18 is a schematic block diagram showing a portion of the VLIW processor according to the fifth embodiment. Similar portion thereof to those shown in FIG. 3 are labeled by the same reference characters and the description thereof is, where appropriate, not repeated.

Referring to FIG. 18, address holding circuits ee1–ee4 and mm1–mm4 are provided corresponding to result buffers e1–e4 and m1–m4, respectively. Address holding circuits ee1, ee2, ee3 and ee4 hold destination addresses e1-a, e2-a, e3-a and e4-a of processing results of instructions held in result buffers e1, e2, e3 and e4, respectively.

Address holding circuits mm1, mm2, mm3 and mm4 hold destination addresses m1-a, m2-a, m3-a and m4-a of processing results of instructions held in result buffers m1, m2, m3 and m4, respectively.

Address holding circuits ee1–ee4 and mm1–mm4 are also provided in the VLIW processor of FIG. 3, even though they are not shown. Therefore, address holding circuits ee1–ee4 and mm1–mm4 are not necessarily provided only for the VLIW processor according to the fourth embodiment. As described later, destination addresses e1-a to e4-a and m1-a to m4-a held in address holding circuits ee1–ee4 and mm1–mm4 are input to bypass control circuit 123.

Figure 19:
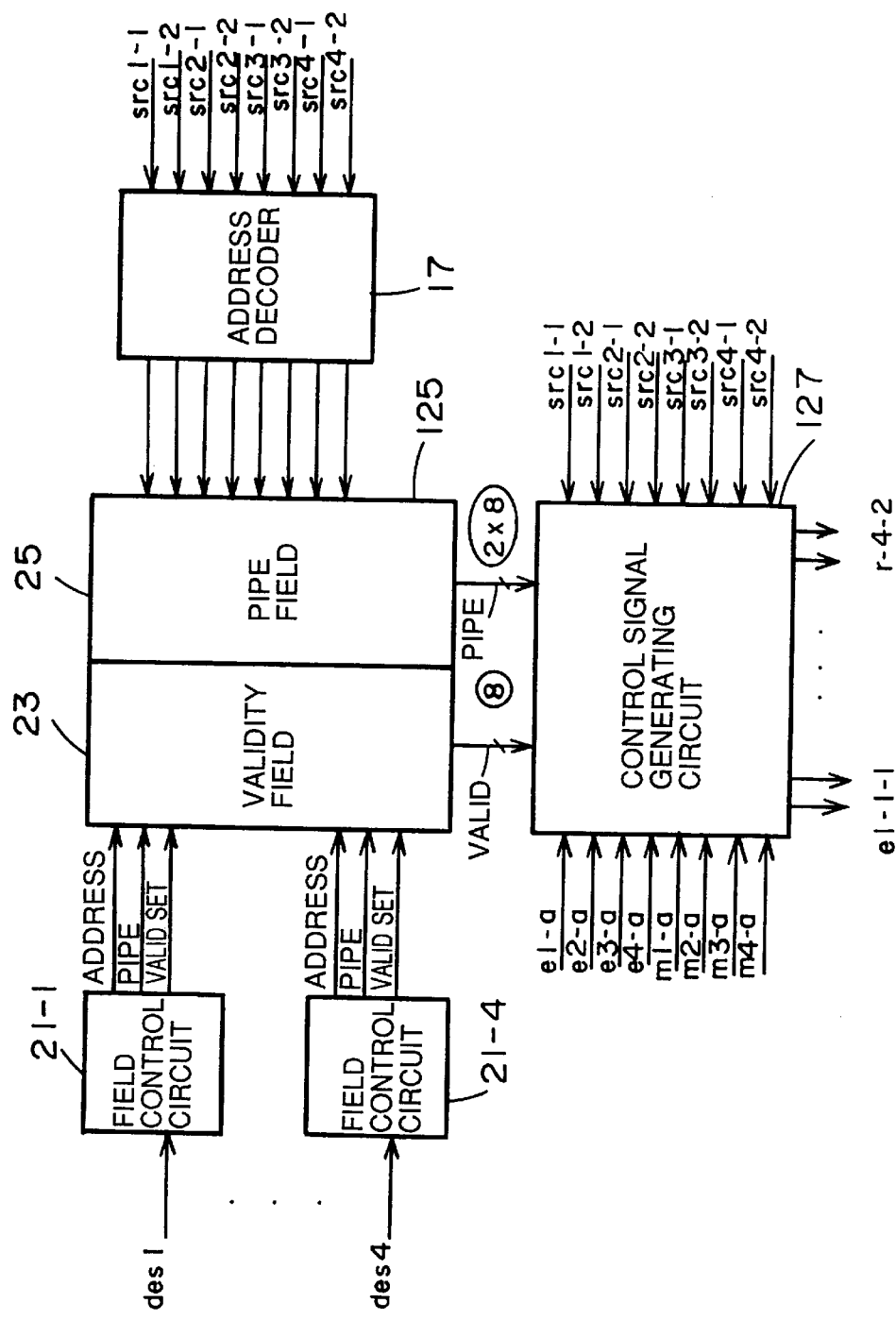
FIG. 19 is a schematic block diagram showing the bypass control circuit of FIG. 18.

FIG. 19 is a schematic block diagram showing bypass control circuit 123 of FIG. 18. Similar portions thereof to those shown in FIG. 5 are labeled by the same reference characters and the description thereof is, where appropriate, not repeated.

Referring to FIG. 19, the bypass control circuit includes field control circuits 21-1 to 21-4, an instruction grasping circuit 125, an address decoder 17 and a control signal generating circuit 127. Instruction grasping circuit 125 includes a field indicating validness/invalidness (referred to as "a validity field" hereinafter) 23 and a functional unit field (referred to as "a pipe field" hereinafter) 25. Similar to the instruction grasping circuit shown in FIG. 6, instruction grasping circuit 125 is divided into a plurality of entries f1-fn. The bypass control circuit shown in FIG. 19 differs from that shown in FIG. 5 in that the bypass control circuit shown in FIG. 19 does not have such stage field 27 as shown in FIG. 5. Therefore, stage field control circuit 54 as shown in FIG. 9 is not provided in instruction grasping circuit 125 shown in FIG. 19, either. Control signal generating circuit 127 receives destination addresses e1-*a* to e4-*a* and m1-*a* to m4-*a* held in address holding circuits ee1–ee4 and mm1–mm4, and source addresses src1-1 to src4-2 of data to be required by latch circuits L1–L8.

Figure 20:
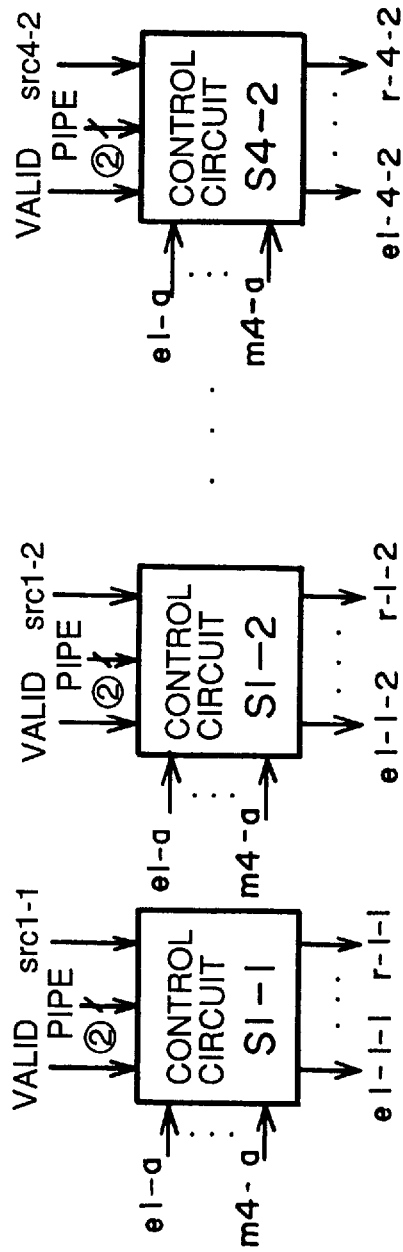
FIG. 20 is a schematic block diagram showing the conrol signal generating circuit of FIG. 19.

FIG. 20 is a schematic block diagram showing control signal generating circuit 127 of FIG. 19. Similar portions thereof to those shown in FIG. 7 are labeled by the same reference characters and the description thereof is, where appropriate, not repeated.

Referring to FIG. 20, control signal generating circuit 127 includes control circuits S1-1 to S4-2. Control circuits S1-1 to S4-2 receive destination addresses e1-*a* to e4-*a* and m1-*a* to m4-*a* held in address holding circuits ee1–ee4 and mm1–mm4. Control circuit S1-1 receives source address src1-1, and signals VALID and PIPE from an entry corresponding to source address src1-1. Similarly, control circuits S1-2 to S4-2 receive corresponding source addresses src1-2 to src4-2 and signals VALID and PIPE from entries corresponding to source addresses src1-2 to src4-2.

Figure 21:
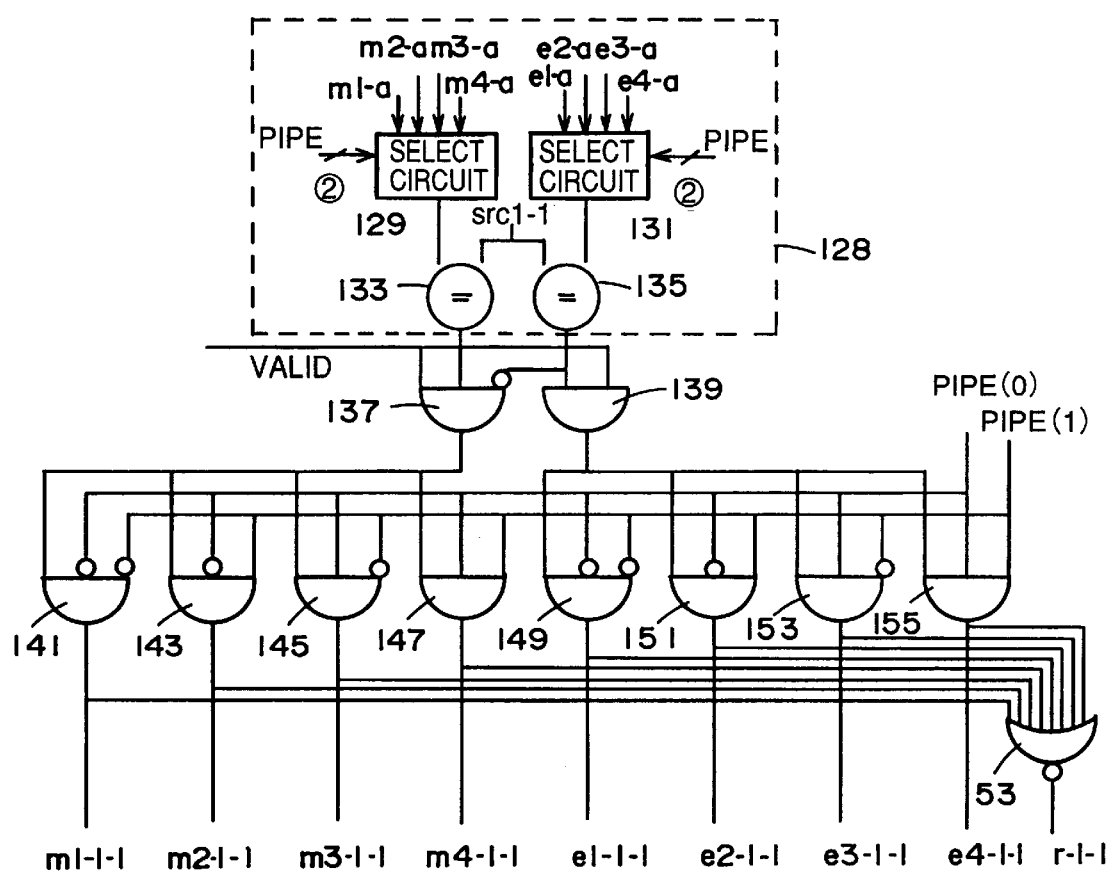
FIG. 21 is a circuit diagram showing the detail of the control circuit S1-1 of FIG. 20.

FIG. 21 is a circuit diagram showing the detail of control circuit S1-1 of FIG. 20. Similar portions thereof to those in FIG. 8 are labeled by the same reference characters and the description thereof is, where appropriate, not repeated. The signals PIPE [0] and PIPE [1] shown in FIG. 21 is similar to those shown in FIG. 8.

Referring to FIG. 21, control circuit S1-1 includes a decision circuit 128, AND circuits 137–155 and an NOR circuit 153. Decision circuit 128 includes select circuits 129 and 131 and comparators 133 and 135. Decision circuit 128 is provided for determining whether source address src1-1 of data to be required by latch circuit L1 matches with any of destination addresses m1-*a* to m4-*a* and e1-*a* to e4-*a* of processing results of instructions existing in eight result buffers e1–e4 and m1–m4 of four functional units 7-1 to 7-4, which will now be described in detail.

Select circuit 129 receives destination addresses m1-*a* to m4-1. Then, select circuit 129 selects destination address m1-*a* when a signal PIPE is "0", it selects destination address m2-*a* when a signal PIPE is "1", it selects destination address m3-*a* when a signal PIPE is "2", and it selects destination address m4-*a* when a signal PIPE is "3". Select circuit 131 selects destination address e1-*a* when a signal PIPE is "0", it selects destination address e2-*a* when a signal PIPE is "1", it selects destination address e3-*a* when a signal PIPE is "2", and it selects destination address e4-*a* when a signal PIPE is "3".

Comparator 133 compares a destination address selected at select circuit 129 with source address src1-1. Then, when the destination address selected at select circuit 129 matches with source address src1-1, comparator 133 outputs an output signal "1" to AND circuit 137, and when they do not match with each other, it outputs an output signal "0". Comparator 135 compares a destination address selected at select circuit 131 with source address src1-1. Then, when the destination address selected at select circuit 131 matches with source address src1-1, comparator 135 outputs an output signal "1", and when they do not match with each other, it outputs an output signal "0".

AND circuits 137 and 139 are provided for checking whether data in pipe field 25 for an entry corresponding to source address src1-1 is valid or invalid since AND circuits 137 and 139 receive a signal VALID. When the signal VALID is "1", that is, when data in the pipe field is valid, an output signal of AND circuit 137 is set to "1" when an output signal of only comparator 133 is "1", and an output signal of only AND circuit 139 is set to "1" when an output signal of only comparator 135 is "1". When the signal VALID is "1" and comparators 133 and 135 both output signals "1"s, an output signal of AND circuit 137 is set to "0" and an output of only AND circuit 139 is set to "1", since the output signal of comparator 135 is inverted and input into AND circuit 137. That is, processing results (i.e., data) of instructions held in result buffers e1–e4 at the instruction execution stage EX are to be bypassed more preferentially than processing results of instructions held in result buffers m1–m4 at the memory access stage MEM.

AND circuits 141–147 receive an output signal from AND circuit 137. AND circuits 149–155 receive an output signal from AND circuit 139. AND circuits 141–155 receive signals PIPE [0] and PIPE [1]. NOR circuit 53 receives output signals from AND circuits 141–155. AND circuits 141–155 output control signals m1-1-1 to m4-1-1 and e1-1-1 to e4-1-1, and NOR circuit 53 outputs control signal r-1-1.

The operation of control circuit S1-1 shown in FIG. 21 will be specifically described with further reference to FIG. 18. Source address src1-1 of data to be required by latch circuit L1 is assumed to match with destination address e3-*a* of a processing result (i.e., data) of an instruction held in result buffer e3. The signal VALID is "1". Select circuits 129 and 131 select destination addresses m3-*a* and e3-*a*, respectively. Comparator 133 compares destination address m3-*a* with source address src1-1 and outputs "0". Comparator 135 compares destination address e3-*a* with source address src1-1 and outputs an output signal "1". Accordingly, output signals of AND circuits 137 and 139 are set to "0" and "1", respectively. The signals PIPE [0] and PIPE [1] are "1" and "0", respectively. Accordingly, the output signal of only AND circuit 153 is set to "1". That is, only control signal e3-1-1 is set to "1". Thus, tristate buffer T33 turns on and the processing result (i.e., the data) of the instruction held in result buffer e3 is transferred to latch circuit L1.

When source address src1-1 of data to be required by latch circuit L1 does not match with any of destination addresses of processing results of instructions existing in eight result buffers e1–e4 and m1–m4 in four functional units 7-1 to 7-4, that is, when data in pipe field 25 for an entry corresponding to source address src1-1 is invalid, output signals of AND circuit 137 and 139 are set to "0"s since the signal PIPE is "0", and output signals of AND circuits 141–155 are set to "0"s. Accordingly, a signal of NOR circuit 53 is set to "1". That is, only control signal r-1-1 is set to "1". Thus, tristate buffer T65 turns on and data is directly read out from register file 5 to latch circuit L1. The circuit configuration of control circuits S1-2 to S4-2 is similar to that of control circuit S1-1 shown in FIG. 21.

In the VLIW processor according to the fifth embodiment, as described above, a bypass control circuit controls bypass by grasping in which functional unit a processing result of an instruction exists. Thus, two comparators 133 and 135 are sufficient for one source address. Furthermore, priority selection between two data is sufficient for one source address. On the other hand, a conventional VLIW processor requires eight comparators for one source address. Also, a conventional VLIW processor requires priority selection among eight data. Thus, circuitry and priority selection are more simplified in the VLIW processor according to the fifth embodiment than in a conventional VLIW processor. This allows faster bypass control as compared with a conventional VLIW processor.

The VLIW processor according to the fifth embodiment may be combined with a characteristic portion of the VLIW processor according to the second embodiment. That is, the four functional units are represented in pipe field 25 shown in FIG. 19 not by two bits but by bit vector of four bits. Accordingly, an output signal from pipe field 25 is a four-bit signal. Thus, the specific configuration of control circuits S1-1 to S4-2 shown in FIG. 20 differs from that shown in FIG. 21.

Figure 22:
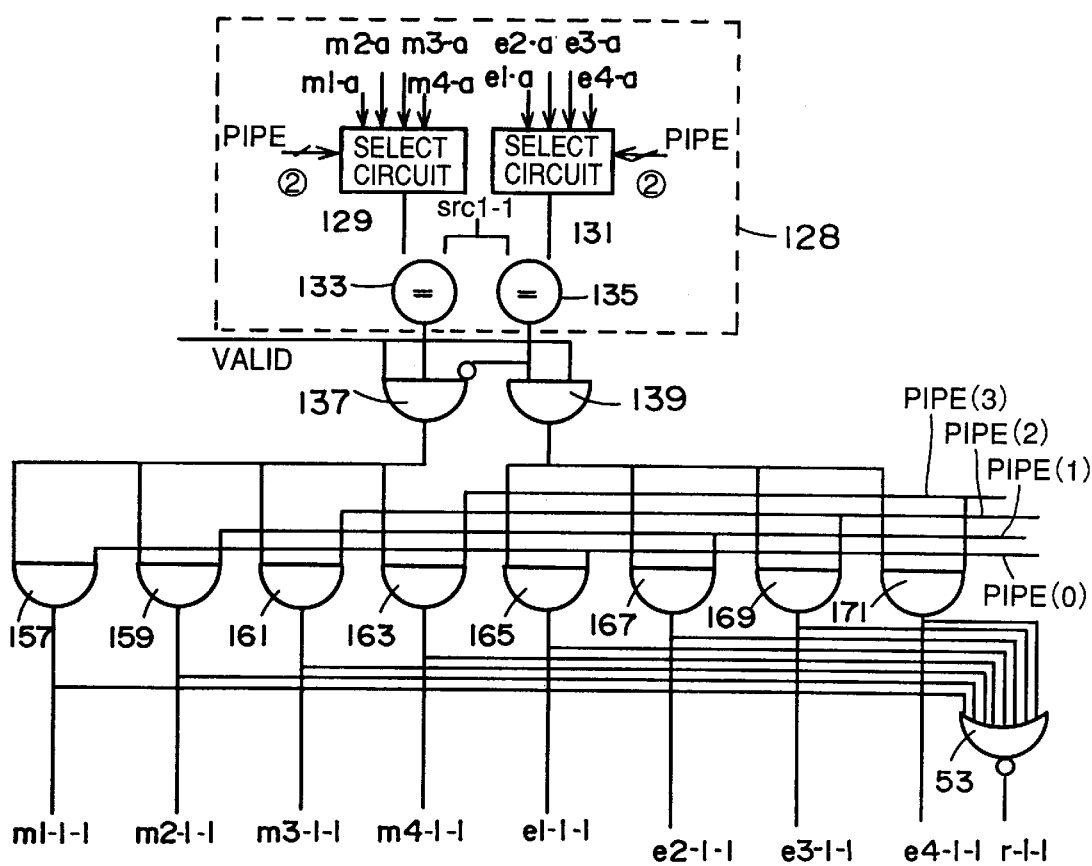
FIG. 22 is a circuit diagram showing the detail of control circuit S1-1 (FIG. 20) when a characteristic portion of a VLIW processor according the second embodiment of the present invention is combined with that of a VLIW processor according to the fifth embodiment of the present invention.

FIG. 22 is a circuit diagram showing the detail of control circuit S1-1 (FIG. 20) when the VLIW processor according to the fifth embodiment is combined with the characteristic portion of the VLIW processor according to the second embodiment. Similar portions thereof to those shown in FIG. 21 are labeled by the same reference characters and the description thereof is, where appropriate, not repeated.

Referring to FIG. 22, the control circuit includes a decision circuit 128, AND circuits 137, 139 and 157–171, and an NOR circuit 53.

Referring to FIG. 22, AND circuits 157–163 and 165–171 receive output signals from AND circuits 137 and 139, respectively. AND circuits 157 and 165, 159 and 167, 161 and 169, and 163 and 171 receive signals PIPE [0], PIPE [1], PIPE [2] and PIPE [3], respectively. The signals PIPE [0]–PIPE [3] are similar to those shown in FIG. 10 (the second embodiment). Output signals of AND circuits 157–171 are input to NOR circuit 153. AND circuits 157–171 output control signals m1-1-1 to m4-1-1 and e1-1-1 to e3-1-1, and NOR circuit 53 outputs control signal r-1-1.

The operation of control circuit S1-1 shown in FIG. 22 will now be specifically described with further reference to FIG. 18. Source address src1-1 of data to be required by latch circuit L1 is assumed to match with destination address e3-a of a processing result (i.e., data) of an instruction held in result buffer e3. The signal VALID "1". A description of processing by decision circuit 128 is not repeated here since it is similar to the specific example described with reference to FIG. 21. An output of AND circuit 137 is set to "0", and an output signal of only AND circuit 139 is set to "1". Signals PIPE [0], PIPE [1] and PIPE [3] are "0"s and only a signal PIPE [2] is "1", since result buffer e3 exists in functional unit 7-3. Accordingly, an output signal of only AND circuit 169 is set to "1". That is, only control signal e3-1-1 is set to "1". Thus, tristate buffer T33 turns on and the operation result (i.e., the data) of the instruction held in result buffer e3 is transferred to latch circuit L1.

When source address src1-1 of data to be required by latch circuit L1 does not match with any of destination addresses of processing results of instructions held in eight result buffers e1–e4 and m1–m4 in four functional units 7-1 to 7-4 (i.e., when a signal VALID is "0"), the operation of control circuit S1-1 shown in FIG. 22 is similar to that of control circuit S1-1 shown in FIG. 21. The circuit configuration of the other control circuits S1-2 to S4-2 is similar to that of control circuit S1-1 shown in FIG. 22.

When the VLIW processor according to the fifth embodiment is thus combined with a characteristic portion of the VLIW processor according to the second embodiment, control circuits S1-1 to S4-2 thereof are more simplified than those of the VLIW processor according to the fourth embodiment. Thus, when the VLIW processor according to the fifth embodiment is combined with the characteristic portion of the VLIW processor according to the second embodiment, still faster bypass control can be achieved as compared with the VLIW processor according to the fourth embodiment.

[SIXTH EMBODIMENT]

The configuration of a VLIW processor as a parallel processor according to a sixth embodiment is similar to those of the VLIW processors shown in FIGS. 1 and 18. The form of a basic instruction decoded at the decoding stage ID of the VLIW processor according to the sixth embodiment is similar to that shown in FIG. 2. In the VLIW processor according to the sixth embodiment, correspondence of tristate buffers T1–T72 to control signals e1-1-1 to r-4-2 controlling tristate buffers T1–T72 is similar to that shown in FIG. 4.

Figure 23:
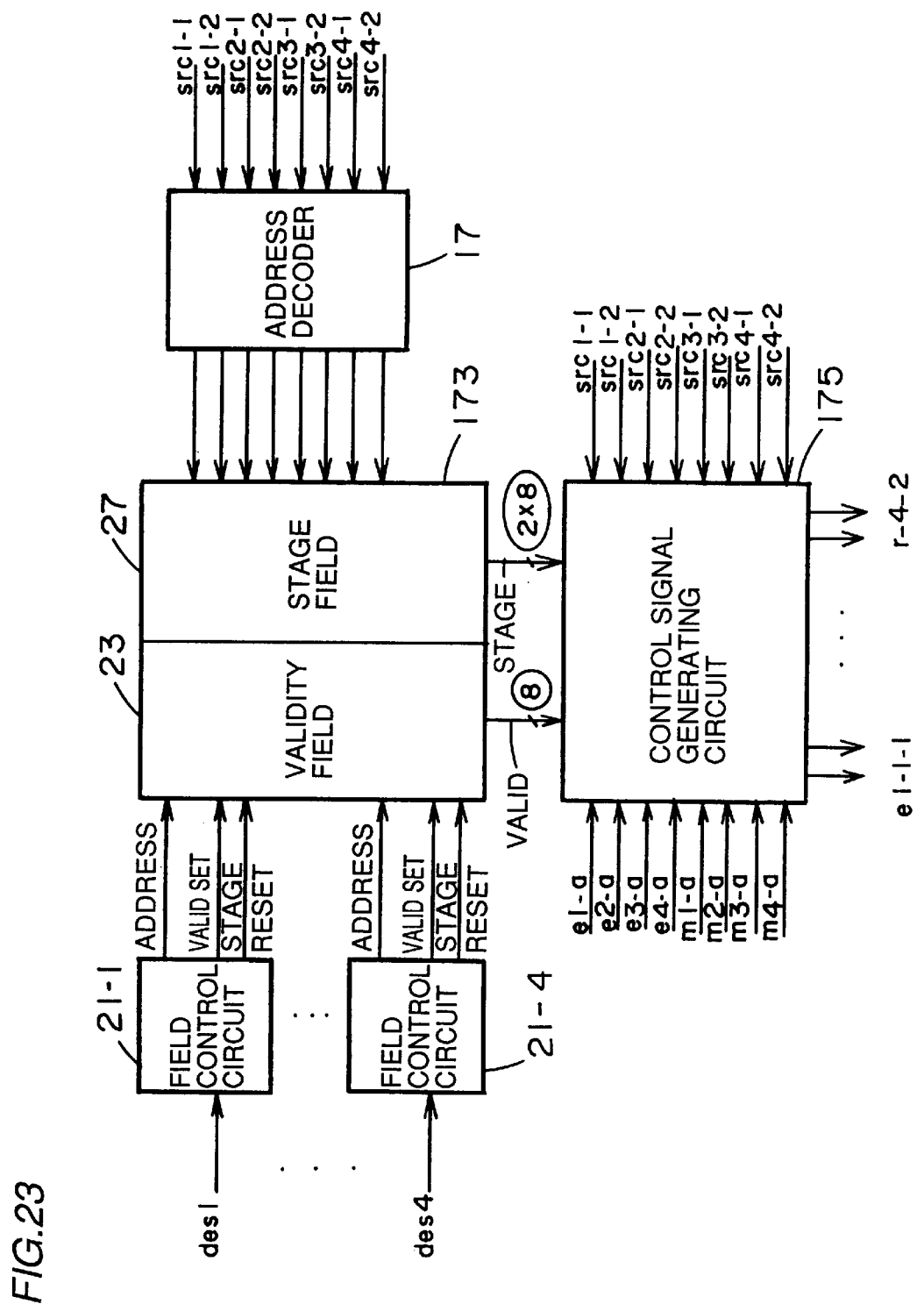
FIG. 23 is a schematic block diagram showing the bypass control circuit (FIG. 18) of a VLIW processor according to a sixth embodiment of the present invention.

FIG. 23 is a schematic block diagram showing bypass control circuit 123 (FIG. 18) of the VLIW processor according to the sixth embodiment. Similar portions thereof to those shown in FIG. 5 are labeled by the same reference characters and the description thereof is, where appropriate, not repeated.

Referring to FIG. 23, the bypass control circuit includes field control circuits 21-1 to 21-4, an instruction grasping circuit 173, an address decoder 171, and control signal generating circuit 175. Instruction grasping circuit 173 includes validity field 23 and stage field 27.

An instruction grasping circuit 173, similar to that shown in FIG. 6, is divided into a plurality of entries f1-fn. Instruction grasping circuit 173 shown in FIG. 23 differs from that shown in FIG. 5 in that instruction grasping circuit 173 shown in FIG. 23 does not include pipe field 25 shown in FIG. 5. Thus, there is no signal PIPE SET input from field control circuits 21-1 to 21-4, either.

Control signal generating circuit 175 receives source addresses src1-1 to src4-2 of eight data to be input to latch circuits L1–L8. Control signal generating circuit 175 also receives destination addresses e1-a to e4-a and m1-a to m4-a held in address holding circuits ee1–ee4 and mm1–mm4.

Figure 24:
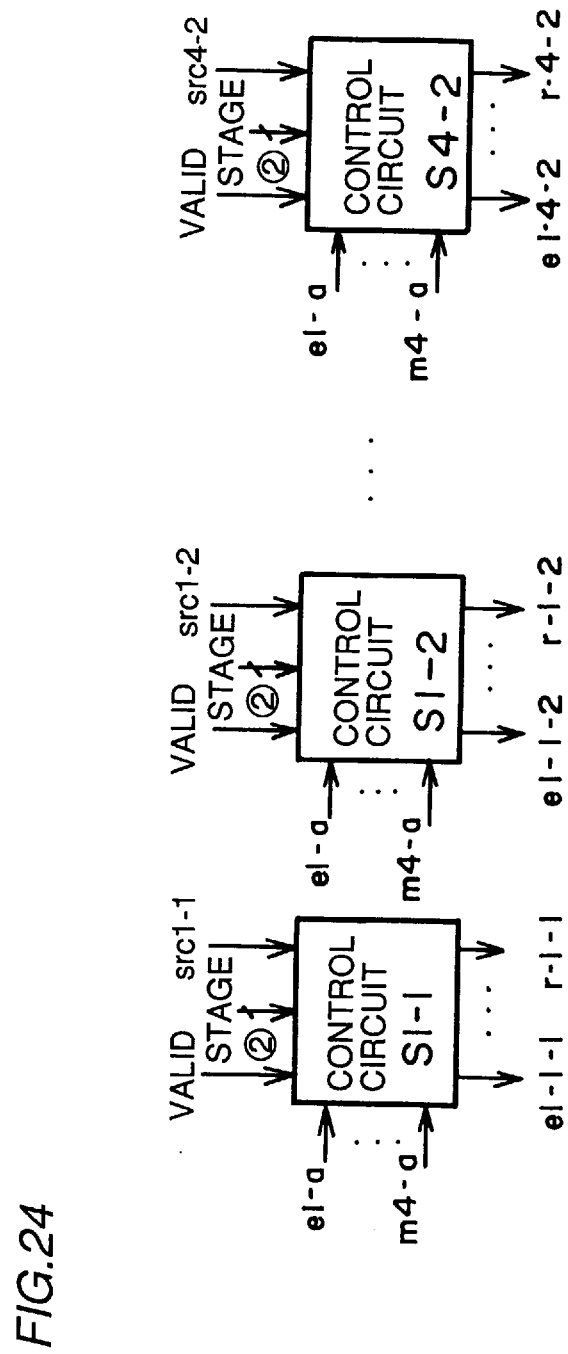
FIG. 24 is a schematic blcok diagram showing the control signal generating circuit of FIG. 23.

FIG. 24 is a schematic block diagram showing control signal generating circuit 175 shown in FIG. 23. Similar portions thereof to those shown in FIG. 7 are labeled by the same reference characters and the description thereof is, where appropriate, not repeated.

Referring to FIG. 24, control signal generating circuit 175 includes control circuits S1-1 to S4-2. Control circuits S1-1 to S4-2 receive destination addresses e1-a to e4-a and m1-a to m4-a. Control circuit S1-1 receives a corresponding source address src1-1, and signals VALID and PIPE from an entry corresponding to source address src1-1. Similarly, control circuits S1-2 to S4-2 also receive corresponding source addresses src1-2 to src4-2, and signals VALID and PIPE from entries corresponding to source addresses src1-2 to src4-2.

Figure 25:
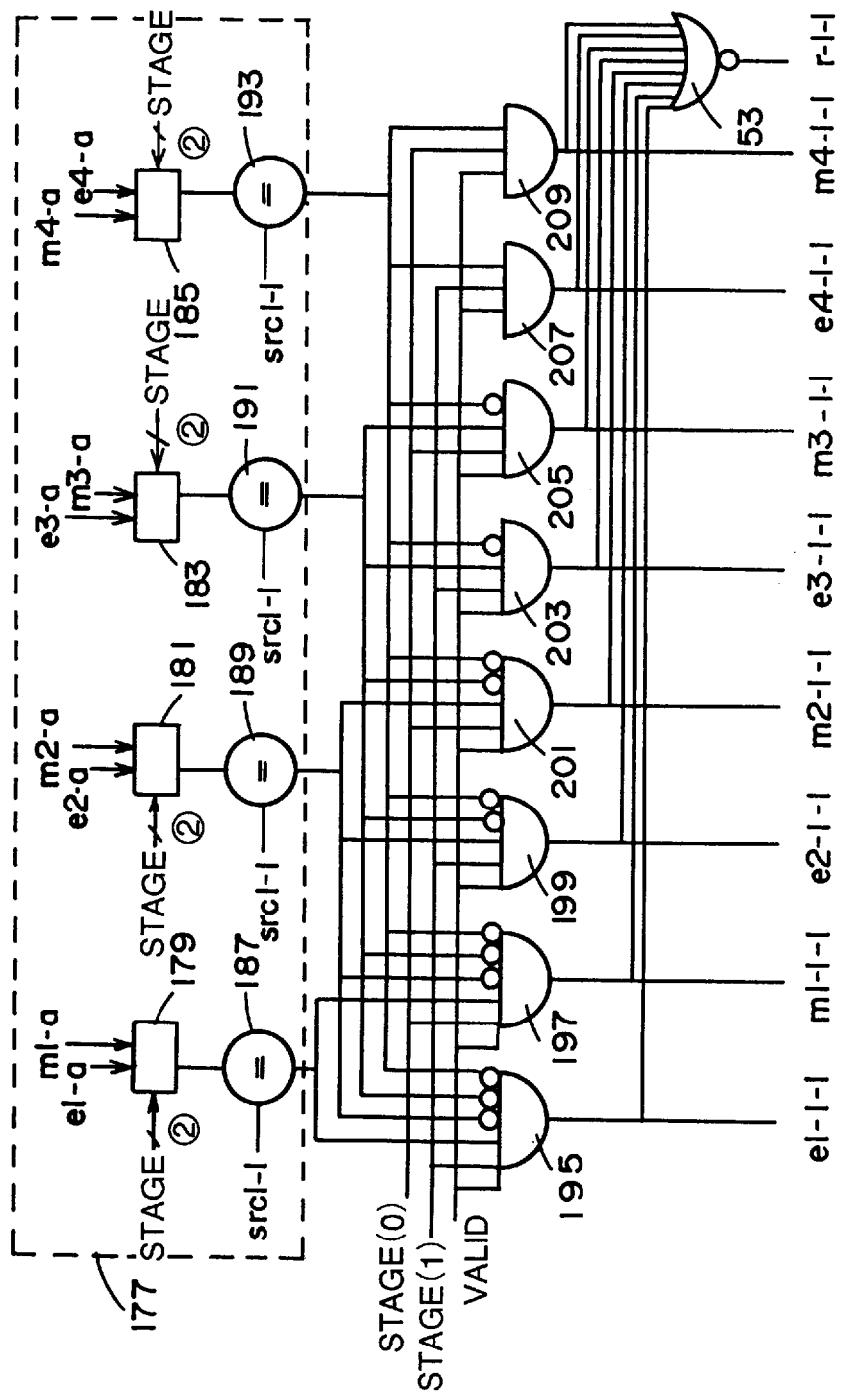
FIG. 25 is a circuit diagram showing the detail of the control circuit S1-1 of FIG. 24.
Figure 28:
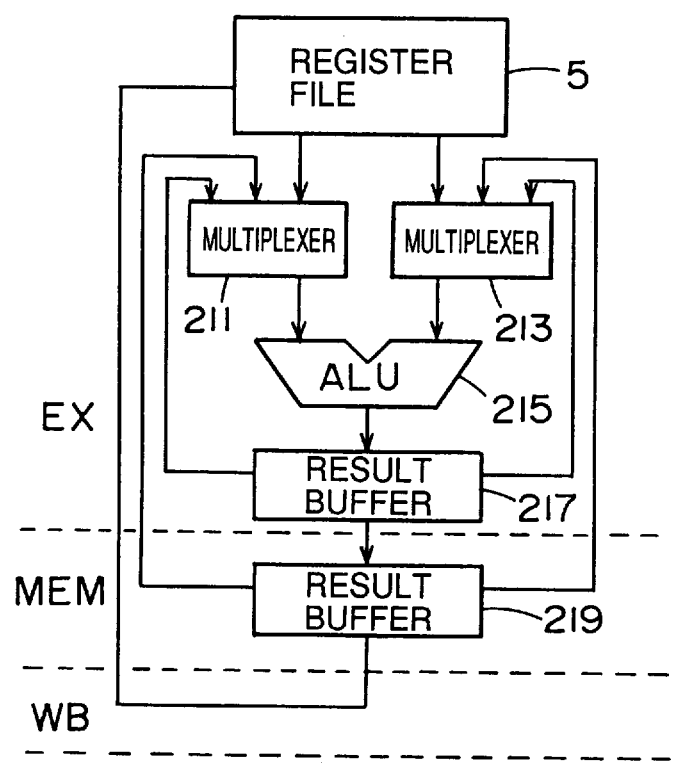
FIG. 28 is a schematic block diagram showing a conventional scalar processor having the bypass scheme.

FIG. 25 is a circuit diagram showing the detail of control circuit S1-1 shown in FIG. 24. Similar portions thereof to those shown in FIG. 8 are labeled by the same reference characters and the description thereof is, where appropriate, not repeated. Referring to FIG. 25, control circuit S1-1 includes a decision circuit 177, AND circuits 195 to 209 and an NOR circuit 153. Decision circuit 177 includes select circuits 179–185 and comparators 187–193. Decision circuit 177 is provided for determining whether source address src1-1 of data to be required by latch circuit L1 matches with a destination address of a processing result (i.e., data) of an instruction existing in any of result buffers e1–e4 and m1–m4 in four functional units 7-1 to 7-4, which will be described below in detail.

Comparators 179, 181, 183 and 185 receive destination addresses e1-*a* and m1-*a*, e2-*a* and m2-*a*, e3-*a* and m3-*a*, and e4-*a* and m4-*a*, respectively. Comparators 179–185 also receive a signal STAGE. When the signal STAGE is "1", that is, when it indicates the execution stage EX, comparators 179, 181, and 183 and 185 select destination addresses e1-*a*, e2-*a*, e3-*a* and e4-*a*, respectively. When the signal STAGE is "2", that is, when it indicates the memory access stage MEM, comparator 179, 181, 183 and 185 select destination addresses m1-*a* and m2-*a*, m3-*a* and m4-*a*, respectively. When the signal STAGE is neither "1" nor "2", comparators 179–185 output "0"s.

Comparators 187, 189, 191 and 193 compare destination addresses selected by select circuits 179, 181, 183 and 185 with source address src1-1, respectively, and output "1"s when they match with each other and output "0"s when they do not match with each other.

Thus, decision circuit 177 determines whether source address src1-1 of data to be required by latch circuit L1 matches with a destination address of a processing result (i.e., data) of an instruction existing in any of eight result buffers e1–e4 and m1–m4 in four functional units 7-1 to 7-4, to identify a functional unit in which a processing result of an instruction having a destination address matching with source address src1-1 of data to be required by latch circuit L1 exists.

That is, when an output signal of comparator 187 is "1", it indicates that a processing result of an instruction having a destination address matching with source address src1-1 exists in functional unit 7-1. When an output signal of comparator 189 is "1", it indicates that a processing result of an instruction having a destination address matching with source address src1-1 exists in functional unit 7-2. When an output signal of comparator 191 is "1", it indicates that a processing result of an instruction having a destination address matching with source address src1-1 exists in functional unit 7-3. When an output signal of comparator 193 is "1", it indicates that a processing result of an instruction having a destination address matching with source address src1-1 exists in functional unit 7-4.

When a signal STAGE [0] is "1", the signal STAGE is "2" or "3". When a signal STAGE is "2", it indicates the execution stage EX. Accordingly, the signal STAGE [0] is input to AND circuits 197, 201, 205 and 209 generating control signals m1-1-1, m2-1-1, m3-1-1 and m4-1-1 for controlling tristate buffers T1, T17, T33 and T49 corresponding to result buffers e1–e4 of the execution stage EX. When a signal STAGE [1] is "1", the signal STAGE is "1"0 or "3". When a signal STAGE is "1", it indicates the memory access stage MEM. Accordingly, the signal STAGE [1] is input to AND circuits 195, 199, 203 and 207 generating control signals e1-1-1, e2-1-1, e3-1-1 and e4-1-1 for controlling tristate buffers T9, T25, T41 and T57 corresponding to result buffers m1–m4 of the memory access stage MEM.

As described above, signals STAGE [0] and STAGE [1] need not be input to all of AND circuits 195–209. It is not an issue that when a signal STAGE [0] is "1" or when a signal STAGE [1] is "1", the signal STAGE may be "3", since AND circuits 195–209 all receive a signal VALID. That is, when a signal STAGE is it indicates that a processing result of an instruction exists in the write back stage EB, and in this case, a signal VALID is set to "0" since data may be read out directly from register file 5.

In control circuit S1-1, processing results of instructions held in functional unit 7-2 result buffers e2 and m2, functional unit 7-3 result buffers e3 and m3, and in a functional unit 7-4 result buffers e4 and m4 are adapted to be bypassed more preferentially than processing results of instructions held in functional unit 7-1 result buffers e1 and m1, functional unit 7-2 result buffers e2 and m2, and in functional unit 7-3 result buffers e3 and m3, respectively. Thus, AND circuits 195 and 197 receive output signals of comparators 187, 189, 191 and 193, AND circuits 199 and 201 receive output signals of comparators 189, 191 and 193, AND circuits 203 and 205 receive output signals of comparators 191 and 193, and AND circuits 207 and 209 receive an output signal of comparator 193.

The operation of control circuit S1-1 will be specifically described with further reference to FIG. 18. When source address src1-1 of data required by latch circuit L1 is assumed to match with only destination address e1-*a* held in address holding circuit e1, the signal STAGE is "1". Accordingly, select circuits 179, 181, 183 and 185 output destination addresses e1-*a*, e2-*a*, e3-*a* and m4-*a*, respectively. Then, an output of only comparator 187 is set to "1" and outputs of comparators 189–193 are set to "0"s. The signals STAGE [0] and STAGE [1] are "0" and "1", respectively. Furthermore, a signal VALID is assumed to be "1". In such a case, an output signal of only AND circuit 195 is set to "1". That is, only control signal e1-1-1 is set to "1". Thus, tristate buffer T1 turns on and the processing result of the instruction held in result buffer e1 is transferred to latch circuit L1.

When source address src1-1 of data to be required to be latch circuit L1 does not match with any of destination addresses e1-*a* to e4-*a* and m1-*a* to m4-*a* held in address holding circuits ee1–ee4 and mm1–mm4, that is, when a signal VALID is "0", output signals of AND circuits 195–209 are all set to "0"s. Accordingly, only control signal r-1-1 output from NOR circuit 53 is set to "1". Thus, tristate buffer T65 turns on and data is read out directly from register file 5 to latch circuit L1. The circuit configuration of control circuits S1-2 to S4-2 is similar to that of control circuit S1-1 shown in FIG. 25.

As described above, in the VLIW processor according to the sixth embodiment, entries for instruction grasping circuit 173 are used to grasp in which stage an instruction having a destination address corresponding to an entry exists. Thus, four comparators 187–193 are sufficient for one source address. On the other hand, a conventional VLIW processor requires eight comparators for one source address. Furthermore, in the VLIW processor according to the sixth embodiment, since four comparators 187–193 are sufficient for one source address, priority selection among four output signals from comparators 187–193 suffices. On the other hand, a conventional VLIW processor requires priority selection among eight data for one source address. Thus, in the VLIW processor according to the sixth embodiment, its circuitry is simplified and the number of objects to which priority selection is applied is reduced so that fast bypass control can be achieved.

The VLIW processor according to the sixth embodiment can be combined with a characteristic portion of the VLIW processor according to the third embodiment. That is, the four stages are represented in stage field 27 by bit vector representation using four bits. This allows provision of bit shifter 89 (FIG. 12) rather than stage field control circuit 54 (FIG. 9), to control stage field 27. Thus, still more simplified circuitry and still faster bypass control can be achieved than in the VLIW processor according to the sixth embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A parallel processor having a register file for storing therein a processing result of an instruction according to a destination address of the instruction, and processing in parallel a plurality of said instructions included in one basic instruction, said parallel processor comprising:

a plurality of functional units each processing a corresponding one of said instructions, each of said functional units having a plurality of processing stages for pipelining said corresponding one of successively input said instructions;

bypass means for selectively supplying a plurality of said processing results existing in a plurality of said processing stages in said plurality of functional units to a plurality of initial ones of said processing stages in said plurality of functional units; and bypass control means using a plurality of entries corresponding to a plurality of addresses of said register file for controlling, by grasping in which one of said functional units and in which one of said processing stages said instruction having said destination address corresponding to said entry exists, said bypass means such that when said destination address of said instruction existing in any of said plurality of processing stages of said plurality of functional units matches with a source address of said instruction to be processed at said initial processing stage of said functional unit, said processing result of said instruction having said matching destination address is supplied from said processing stage in which said instruction having said matching destination address exists to said initial processing stage at which said instruction having said matching source address is to be processed, when said bypass control means grasps said instruction having a certain destination address and when a new said instruction having a same one as said certain destination address is input to any of said plurality of functional units, said bypass control means grasping the newly input said instruction by said entry corresponding to said certain destination address.

2. The parallel processor according to claim 1, wherein:

said bypass control means includes instruction grasping means formed of a functional unit field having data indicating in which one of said functional units said instruction grasped exists, of a processing stage field having data indicating in which one of said processing stages said instruction grasped exists, and of a field indicating validness/invalidness having data indicating whether data in said functional unit field and said processing stage field are valid or invalid, said instruction grasping means being divided into said plurality of entries;

when a new said instruction is input, said bypass control means sets said field indicating validness/invalidness for said entry corresponding to a destination address of said new instruction, and sets said functional unit for said entry corresponding to the destination address of said new instruction to indicate said functional unit to which said new instruction is input;

when said instruction newly input exists in a processing stage previous to said initial processing stage, said bypass control means resets said processing stage field for said entry corresponding to a destination address of said new instruction; and said bypass control means newly sets said processing stage field for said entry whenever said instruction having said destination address corresponding to said entry moves to any of said processing stages.

3. The parallel processor according to claim 1, wherein said bypass control means includes instruction grasping means formed of a functional unit field having data indicating in which one of said functional units said instruction grasped exists and a processing stage field having data indicating in which one of said processing stages said instruction grasped exists, said instruction grasping means being divided into said plurality of entries, a bit vector the number of bits of which is equal to that of said plurality of functional units being used in said functional unit field in order to indicate in which one of said functional units said instruction exists;

when a new said instruction is input to said functional unit, said bypass control means sets such bit of said bit vector that corresponds to said functional unit to which said new instruction is input in said functional unit field for said entry corresponding to said destination address of said new instruction, and when a newly input said instruction exists at a stage previous to said initial processing stage, said bypass control means resets said processing stage field for said entry corresponding to a destination address of said newly input instruction; and said bypass control means newly sets said processing stage field for said entry whenever said instruction having said destination address corresponding to said entry moves to any of said processing stages, and data in said functional unit field and said processing stage field for said entry is valid when any one of bits of said bit vector in said functional unit field for said entry is set, and data in said functional unit field and said processing stage field for said entry is invalid when any of bits of said bits vector is not set.

4. A parallel processor having a register file for storing therein a processing result of an instruction according to a destination address of the instruction, and processing in parallel a plurality of said instructions included in one basic instruction, said parallel processor comprising:

a plurality of functional units each processing a corresponding one of said instructions, each of said functional units having a plurality of processing stages for pipelining said corresponding one of successively input said instructions;

bypass means for selectively supplying a plurality of said processing results existing in a plurality of said processing stages in said plurality of functional units to a plurality of initial ones of said processing stages in said plurality of functional units; and bypass control means using a plurality of entries corresponding to a plurality of addresses of said register file for controlling, by grasping in which one of said functional units said instruction having said destination address corresponding to said entry exists, said bypass means such that when said destination address of said instruction existing in any of said plurality of processing stages of said plurality of functional units matches with a source address of said instruction to be processed at said initial processing stage of said functional unit, said processing result of said instruction having said matching destination address is supplied from said processing stage in which said instruction having said matching destination address exists to said initial processing stage at which said instruction having said matching source address is to be processed, when said bypass control means grasps said instruction having a certain destination address and when a new said instruction having a same one as said certain destination address is input to any of said plurality of functional units, said bypass control means grasping the newly input said instruction by said entry corresponding to said certain destination address.

5. The parallel processor according to claim 4, wherein said bypass control means includes:

instruction grasping means formed of a functional unit field having data indicating in which one of said functional units said instruction grasped exists and of a field indicating validness/invalidness having data indicating whether data in said functional unit field is valid or invalid, said instruction grasping means being divided into said plurality of entries, when a new said instruction is input into said functional unit, said bypass control means setting said field indicating validness/invalidness for said entry corresponding to a destination of said new instruction, and setting said functional unit field for said entry corresponding to a destination address of said new instruction to indicate said functional unit to which said new instruction is input; and a plurality of decision means provided corresponding to a plurality of said source addresses of said plurality of instructions included in one said basic instruction, each for determining whether a source address corresponding to said instruction newly input matches with a destination address of said instruction existing in any of said plurality of processing stages of said plurality of functional units, said decision means including a plurality of select means provided corresponding to said plurality of processing stages in each of said functional units, said select means receiving a plurality of said destination addresses of a plurality of said instructions existing in such plurality of said processing stages in said plurality of functional units that correspond to said select means, and data in said functional unit field for said entry corresponding to said source address of said instruction newly input, said select means outputting a destination address of an instruction existing in said processing stage corresponding to said functional unit indicated by the input data of said functional unit field, said decision means further including a plurality of compare means provided corresponding to said plurality of select means, said compare means comparing said destination address output from corresponding said select means with said source address of said instruction newly input and determining whether said source address of said newly input instruction matches with said destination address output from the corresponding said select means.

6. A parallel processor having a register file for storing therein a processing result of an instruction according to a destination address of the instruction, and processing in parallel a plurality of said instructions included in one basic instruction, said parallel processor comprising:

a plurality of functional units each processing a corresponding one of said instructions, each of said functional units having a plurality of processing stages for pipelining said corresponding one of successively input said instructions;

bypass means for selectively supplying a plurality of said processing results existing in a plurality of said processing stages in said plurality of functional units to a plurality of initial ones of said processing stages in said plurality of functional units; and bypass control means using a plurality of entries corresponding to a plurality of addresses of said register file for controlling, by grasping in which one of said processing stages said instruction having said destination address corresponding to said entry exists, said bypass means such that when said destination address of said instruction existing in any of said plurality of processing stages of said plurality of functional units matches with a source address of said instruction to be processed at said initial processing stage of said functional unit, said processing result of said instruction having said matching destination address is supplied from said processing stage in which said instruction having said matching destination address exists to said initial processing stage at which said instruction having said matching source address is to be processed, when said bypass control means grasps said instruction having a certain destination address and when a new said instruction having a same one as said certain destination address is input to any of said plurality of functional units, said bypass control means grasping the newly input said instruction by said entry corresponding to said certain destination address.

7. The parallel processor according to claim 6, wherein said bypass control means includes:

instruction grasping means formed of a processing stage field having data indicating in which one of said processing stages said instruction grasped exists and of a field indicating validness/invalidness having data indicating whether data in said processing stage field is valid or invalid, said instruction grasping means being divided into said pluralty of entries, said bypass control means setting said field indicating validness/invalidness for said entry corresponding to a destination addresss of a new said instruction when said new instruciton is input, said bypass control means resetting said processing stage field for said entry corresponding to a destination address of said instruciton newly input when said newly input instrctuion exists at a stage previous to said initial processing stage, said bypass control means newly setting said processing stage field for said entry whenever said instruction having said destination address corresponding to said entry moves to any of said processing stages; and a plurality of decision means provided corresponding to a plurality of said source addresses of a plurality of said instructions included in one said basic instruction, each for determining whether a source address corresponding to said instruction newly input matches with a destination address of said instruction existing in any of said plurality of processing stages of said plurality of functional units, said decision means including a plruality of select means provided corresponding to said plurality of functional units, said select means receiving destination addrsses of a plurality of said instructions existing in said plurality of processing stages of a corresponding one of said functional units, and data in said processing stage field for an entry corresponding to a source address of said instruction newly input, said select means outputting said destination address of said instruciton existing in said processing stage corresponding to said processing stage indicated by the input data of said processing stage field, said decision means further including a plurality of compare means provided corresponding to said plurality of select means, said compare means comparing said destination address output from corresponding said select means with said source address of said instruction newly input and determining whether the source address of said instruction newly input matches with said destination address output from the corresponding said select means.

8. The parallel processor according to claim 2, wherein a bit vector the number of bits of which is equal to that of said plurality of functional units is used in said functional unit field to indicate in which one of said functional units said instruction exists.

9. The parallel processor according to claim 5, wherein a bit vector the number of bits of which is equal to that of said plurality of functional units is used in said functional unit field to indicate in which one of said functional units said instruction exists.

10. The parallel processor according to claim 2, wherein
a bit vector the number of bits of which is equal to that of said plurality of processing stages in each of said functional units is used in said processing stage field to indicate in which one of said processing stages said instruction exists, and wherein said instruction grasping means sets such bit of said bit vector that corresponds to said processing stage in which said instruction exists.

11. The parallel processor according to claim 3, wherein
a bit vector the number of bits of which is equal to that of said plurality of processing stages in each of said functional units is used in said processing stage field to indicate in which one of said processing stages said instruction exists, and wherein said instruction grasping means sets such bit of said bit vector that corresponds to said processing stage in which said instruction exists.

12. The parallel processor according to claim 7, wherein
a bit vector the number of bits of which is equal to that of said plurality of processing stages in each of said functional units is used in said processing stage field to indicate in which one of said processing stages said instruction exists, and wherein said instruction grasping means sets such bit of said bit vector that corresponds to said processing stage in which said instruction exists.

13. The parallel procesosr according to claim 2, wherein
a final one of said processing stages in each of said functional units writes said processing result existing therein into said register file according to said destination address and said bypass means is not applied, and wherein said instruction grasping means includes a plurality of processing stage field control means provided corresponding to said plurality of entries each for controlling said processing stage field for a corresponding one of said entries, said processing stage field control means including:

updating means for setting said data in said processing stage field for the corresponding one of said entries whenever said instruction moves to any of said processing stages, such that said data corresponds to said any of said processing stages to which said instruction moves;

reference means having reference data corresponding to the final one of said processing stages; and data comparing means for comparing the data in said processing stage field with said reference data in said reference means and resetting said field indicating validness/invalidness for the corresponding one of said entries when the both data match with each other.

14. The parallel procesosr according to claim 7, wherein
a final one of said processing stages in each of said functional units writes said processing result existing therein into said register file according to said destination address and said bypass means is not applied, and wherein said instruction grasping means includes a plurality of processing stage field control means provided corresponding to said plurality of entries each for controlling said processing stage field for a corresponding one of said entries, said processing stage field control means including:

updating means for setting said data in said processing stage field for the corresponding one of said entries whenever said instruction moves to any of said processing stages, such that said data corresponds to said any of said processing stages to which said instruction moves;

reference means having reference data corresponding to the final one of said processing stages; and data comparing means for comparing the data in said processing stage field with said reference data in said reference means and resetting said field indicating validness/invalidness for the corresponding one of said entries when the both data match with each other.

15. The parallel processor according to claim 10, wherein:
a final one of said processing stages in each of said functional units writes said processes result existing therein according to said destination address and said bypass means is not applied;

the number of bits of said bit vector is larger by one than that of said plurality of processing stages in each one of said functional units, one bit of said bit vector indicating said stage at which said instruction exists just before said instruction moves to the initial one of said processing stages; and said instruction grasping means includes a plurality of processing stage field control means provided corresponding to said plurality of entries each for controlling said processing stage field for a corresponding one of said entries, said processing stage field control means being a bit shifter and setting such bit of said bit vector that corresponds to said stage or any of said processing stages to which said instruction moves whenever said instruction moves to said stage or any one of said processing stages.

16. The parallel processor according to claim 11, wherein:

a final one of said processing stages in each of said functional units writes said processing result existing therein according to said destination address and said bypass means is not applied;

the number of bits of said bit vector is larger by one than that of said plurality of processing stages in each one of said functional units, one bit of said bit vector indicating said stage at which said instruction exists just before said instruction moves to the initial one of said processing stages; and said instruction grasping means includes a plurality of processing stage field control means provided corresponding to said plurality of entries each for controlling said processing stage field for a corresponding one of said entries, said processing stage field control means being a bit shifter and setting such bit of said bit vector that corresponds to said stage or any of said processing stages to which said instruction moves whenever said instruction moves to said stage or any one of said processing stages.

17. The parallel processor according to claim 12, wherein:

a final one of said processing stages in each of said functional units writes said processing result existing therein according to said destination address and said bypass means is not applied;

the number of bits of said bit vector is larger by one than that of said plurality of processing stages in each one of said functional units, one bit of said bit vector indicating said stage at which said instruction exists just before said instruction moves to the initial one of said processing stages; and said instruction grasping means includes a plurality of processing stage field control means provided corresponding to said plurality of entries each for controlling said processing stage field for a corresponding one of said entries, said processing stage field control means being a bit shifter and setting such bit of said bit vector that corresponds to said stage or any of said processing stages to which said instruction moves whenever said instruction moves to said stage or any one of said processing stages.

* * * * *